(12) United States Patent
Yamaji et al.

(10) Patent No.: US 10,975,108 B2
(45) Date of Patent: Apr. 13, 2021

(54) TETRAZOLE SILANE COMPOUND, METHOD FOR SYNTHESIZING SAID COMPOUND AND USE THEREOF

(71) Applicant: SHIKOKU CHEMICALS CORPORATION, Kagawa (JP)

(72) Inventors: Noriaki Yamaji, Kagawa (JP); Takayuki Murai, Kagawa (JP); Miya Tanioka, Kagawa (JP); Shusaku Iida, Kagawa (JP); Masato Katsumura, Kagawa (JP); Takahito Imamine, Kagawa (JP); Masahiko Tsujino, Kagawa (JP); Tomoya Mae, Kagawa (JP); Hirohiko Hirao, Kagawa (JP)

(73) Assignee: SHIKOKU CHEMICALS CORPORATION, Kagawa (JP)

( * ) Notice: Subject to any disclaimer, the term of this patent is extended or adjusted under 35 U.S.C. 154(b) by 0 days.

(21) Appl. No.: 16/648,454

(22) PCT Filed: Jul. 31, 2018

(86) PCT No.: PCT/JP2018/028758
§ 371 (c)(1),
(2) Date: Mar. 18, 2020

(87) PCT Pub. No.: WO2019/058773
PCT Pub. Date: Mar. 28, 2019

(65) Prior Publication Data
US 2020/0223875 A1    Jul. 16, 2020

(30) Foreign Application Priority Data

Sep. 22, 2017    (JP) .............................. JP2017-182673

(51) Int. Cl.
C07F 7/18      (2006.01)
C23C 22/05    (2006.01)
B32B 15/08    (2006.01)

(52) U.S. Cl.
CPC ............ *C07F 7/1892* (2013.01); *C23C 22/05* (2013.01); *B32B 15/08* (2013.01)

(58) Field of Classification Search
CPC .... C07F 7/0836; C07F 7/1804; C07F 7/1872; C07F 7/18; C07F 7/1892; C23C 22/05; B32B 15/08
See application file for complete search history.

(56) References Cited

U.S. PATENT DOCUMENTS

| | | | | |
|---|---|---|---|---|
| 5,744,069 | A * | 4/1998 | Maeda .................... | C23F 11/10 252/389.61 |
| 6,106,899 | A * | 8/2000 | Nakagawa ............. | H05K 3/389 427/327 |
| 9,688,704 | B2 * | 6/2017 | Miura ........................ | C09J 5/02 |
| 2012/0021232 | A1 * | 1/2012 | Hack ...................... | C07F 7/1804 428/447 |
| 2013/0319610 | A1 * | 12/2013 | Wiessler ............... | C07D 403/04 156/326 |
| 2016/0368935 | A1 * | 12/2016 | Miura .................... | C07F 7/1804 |
| 2020/0031852 | A1 * | 1/2020 | Murai ........................ | C09J 9/02 |

FOREIGN PATENT DOCUMENTS

| | | | | |
|---|---|---|---|---|
| JP | 6-184771 | | 7/1994 | |
| JP | 06184771 | A * | 7/1994 | ............ C23F 11/149 |
| JP | 7-145491 | | 6/1995 | |
| JP | 10-193510 | | 7/1998 | |
| JP | 10193510 | A * | 7/1998 | |
| JP | 11-43778 | | 2/1999 | |
| JP | 2002-363189 | | 12/2002 | |
| JP | 2015-54987 | | 3/2015 | |
| JP | 2015054987 | A * | 3/2015 | |
| JP | 2015-214743 | | 12/2015 | |
| JP | 2016-121348 | | 7/2016 | |
| JP | 2016121348 | A * | 7/2016 | |
| WO | WO-2017139821 | A1 * | 8/2017 | ............. C23C 22/02 |

OTHER PUBLICATIONS

CAS Abstract WO 2017139821 (2017) (Year: 2017).*
English-Language Machine Translation of WO 2017139821 (2017) (Year: 2017).*
M. Nasrollahzadeh, 1161 Journal of Molecular Structure, 453-463 (2018) (Year: 2018).*
CAS Abstract and Indexed Compound, M. Nasrollahzadeh, Journal of Molecular Structure (Mar. 2, 2018) (Year: 2018).*
M. Nasrollahzadeh, 8 RSC Advances, 27631-27644 (2018) (Year: 2018).*
Email Communication with CAS Re: M. Nasrollahzadeh, 1161 Journal of Molecular Structure, 453-463, 2018 (Aug. 17, 2020) (Year: 2020).*
CAS Abstract of Compound RN 2200249-87-0 (Mar. 27, 2018) (Year: 2018).*
CASREACT Abstract and Indexed Reactions, M. Nasrollahzadeh, Journal of Molecular Structure (2018) (Year: 2018).*

(Continued)

*Primary Examiner* — Alexander R Pagano
(74) *Attorney, Agent, or Firm* — Wenderoth, Lind & Ponack, L.L.P.

(57) ABSTRACT

The objectives of the present invention are: to provide a novel tetrazole silane compound, a method for synthesizing the same, and a silane coupling agent containing the tetrazole silane compound as a component; and to provide a surface treatment solution using the tetrazole silane compound, a method for surface treatment, and a method for adhering two different materials. The tetrazole silane compound according to the present invention is a compound represented by chemical formula (I). (In formula (I), X, R, and n are respectively the same as defined in the specification.)

[Chem. 1]

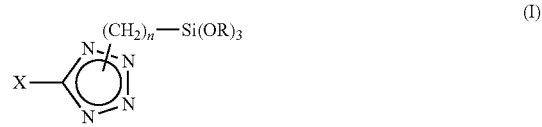

(I)

32 Claims, No Drawings

(56) References Cited

OTHER PUBLICATIONS

English-Language Machine Translation of JP 10-193510 A (1998) (Year: 1998).*
English-Language Machine Translation of JP 2016-121348 A (2016) (Year: 2016).*
International Search Report, issued in corresponding International Patent Application No. PCT/JP2018/028758, with English language translation, dated Oct. 30, 2018.

* cited by examiner

TETRAZOLE SILANE COMPOUND, METHOD FOR SYNTHESIZING SAID COMPOUND AND USE THEREOF

TECHNICAL FIELD

The present invention relates to a novel tetrazole silane compound, a surface treatment solution and a surface treatment method using the tetrazole silane compound, and use thereof.

BACKGROUND ART

As a component of a silane coupling agent, an organic compound having a silicon atom in its molecule has been used. Such a substance has functional groups having different affinities in the molecule, and exhibits a function as an intermediary between organic materials and inorganic materials that are not normally compatible. Therefore, it is an essential agent for development and production of composite materials.

Patent Literature 1 proposes, as a component of a silane coupling agent used as a primer for bonding glass or metal to rubber, various substances having a structure where a nitrogen containing heterocyclic ring such as triazole or thiadiazole is connected to a silyl group such as a trimethoxysilyl group or a triethoxysilyl group, through an organic group having a thioether (sulfide) bond or the like.

Patent Literature 2 proposes 1N-trimethoxysilylpropyl-1,2,4-triazole as a silane compound used as a corrosion inhibitor for aluminum and magnesium alloys.

CITATION LIST

Patent Literature

Patent Literature 1: JP-A-2002-363189
Patent Literature 2: US-A-2012/0021232

SUMMARY OF INVENTION

Technical Problem

An object of the present invention is to provide a novel tetrazole silane compound, a synthesis method thereof, and a silane coupling agent containing the novel tetrazole silane compound as a component.

Also, another object is to provide a surface treatment solution, a surface treatment method, and a bonding method of different materials, using the tetrazole silane compound.

Solution to Problem

As a result of intensive investigations to solve the problems described above, the present inventors have recognized that a novel tetrazole silane compound can be synthesized by reacting a tetrazole compound with a halogenated alkylsilane compound, and thus have completed the present invention.

That is, the present invention encompasses the following [1] to [34].

[1] A tetrazole silane compound represented by the chemical formula (I).

[Chem. 1]

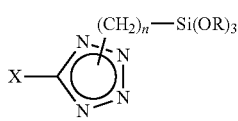
(I)

(In the formula (I), X represents a hydrogen atom, a linear or branched alkyl group having a carbon number of 1 to 12, an aryl group, an aralkyl group, an alkylthio group having a carbon number of 1 to 6, or an amino group which may have a substituent. n represents an integer of 1 to 12. R represents a methyl group or an ethyl group.)

[2] A synthesis method of the tetrazole silane compound described in the above [1], including reacting a tetrazole compound represented by the chemical formula (II) with a halogenated alkylsilane compound represented by the chemical formula (III).

[Chem. 2]

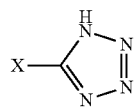
(II)

(In the formula (II), X has the same meaning as described above.)

$$\text{Hal-(CH}_2)_n\text{—Si(OR)}_3 \quad \text{[Chem. 3]}$$

(In the formula (III), R and n have the same meanings as described above. Hal represents a chlorine atom, a bromine atom or an iodine atom.)

[3] A silane coupling agent containing a tetrazole silane compound represented by the following chemical formula (IV) as a component.

[Chem. 4]

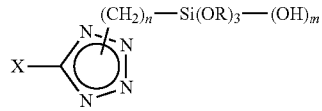
(IV)

(In the formula (IV), X represents a hydrogen atom, a linear or branched alkyl group having a carbon number of 1 to 12, an aryl group, an aralkyl group, an alkylthio group having a carbon number of 1 to 6, or an amino group which may have a substituent. n represents an integer of 1 to 12. R represents a methyl group or an ethyl group. m represents 0 or an integer of 1 to 3.)

[4] A surface treatment solution containing a tetrazole silane compound represented by the following chemical formula (IV).

[Chem. 5]

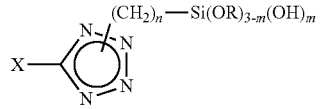
(IV)

(In the formula (IV), X represents a hydrogen atom, a linear or branched alkyl group having a carbon number of 1 to 12, an aryl group, an aralkyl group, an alkylthio group having a carbon number of 1 to 6, or an amino group which may have a substituent.

n represents an integer of 1 to 12. R represents a methyl group or an ethyl group. m represents 0 or an integer of 1 to 3.)

[5] The surface treatment solution according to the above [4], which is used for treating a surface of at least one material selected from the group consisting of a metal, an inorganic material and a resin material.

[6] The surface treatment solution according to the above [4], which is used for bonding two materials selected from the group consisting of a metal, an inorganic material and a resin material.

[7] The surface treatment solution according to the above [5] or [6], in which the metal is at least one selected from the group consisting of copper, aluminum, titanium, nickel, tin, iron, silver, gold, and alloys thereof.

[8] The surface treatment solution according to the above [5] or [6], in which the metal is copper or a copper alloy.

[9] The surface treatment solution according to the above [5] or [6], in which the inorganic material is at least one selected from the group consisting of silicon, a ceramic, a glass and an inorganic salt.

[10] The surface treatment solution according to the above [9], in which the ceramic is at least one selected from the group consisting of alumina, silicon carbide, aluminum nitride, silicon nitride, and barium titanate.

[11] The surface treatment solution according to the above [5] or [6], in which the resin material is at least one selected from the group consisting of an acrylate resin, an epoxy resin, an olefin resin, a polybenzoxazole resin, a silicone resin, and a polyimide resin.

[12] A surface treatment method of metal, including bringing the surface treatment solution described in the above [4] into contact with a surface of a metal.

[13] The surface treatment method of metal according to the above [12], in which the metal is at least one selected from the group consisting of copper, aluminum, titanium, nickel, tin, iron, silver, gold, and alloys thereof.

[14] The surface treatment method of metal according to the above [12], in which the metal is copper or a copper alloy.

[15] The surface treatment method of metal according to the above [14], including, before bringing the surface treatment solution into contact with a surface of copper or a copper alloy, bringing an aqueous solution containing a copper ion into contact with the surface of the copper or the copper alloy.

[16] The surface treatment method of metal according to the above [14] or [15], including, after bringing the surface treatment solution into contact with a surface of copper or a copper alloy, bringing an aqueous acidic solution or an aqueous alkaline solution into contact with the surface of the copper or the copper alloy.

[17] A surface treatment method of an inorganic material, including bringing the surface treatment solution described in the above [4] into contact with a surface of an inorganic material.

[18] The surface treatment method of an inorganic material according to the above [17], in which the inorganic material is at least one selected from the group consisting of silicon, a ceramic, a glass and an inorganic salt.

[19] The surface treatment method of an inorganic material according to the above [18], in which the ceramic is at least one selected from the group consisting of alumina, silicon carbide, aluminum nitride, silicon nitride, and barium titanate.

[20] A surface treatment method of a resin material, including bringing the surface treatment solution described in the above [4] into contact with a surface of a resin material.

[21] The surface treatment method of a resin material according to the above [20], in which the resin material is at least one selected from the group consisting of an acrylate resin, an epoxy resin, an olefin resin, a polybenzoxazole resin, a silicone resin, and a polyimide resin.

[22] A bonding method between a metal and a resin material, including bringing the surface treatment solution described in the above [4] into contact with at least one of a metal and a resin material to form a chemical film, and bonding the metal and the resin material to each other through the chemical film.

[23] A bonding method between an inorganic material and a resin material, including bringing the surface treatment solution described in the above [4] into contact with at least one of an inorganic material and a resin material to form a chemical film, and bonding the inorganic material and the resin material to each other through the chemical film.

[24] A bonding method between a metal and an inorganic material, including bringing the surface treatment solution described in the above [4] into contact with at least one of a metal and an inorganic material to form a chemical film, and bonding the metal and the inorganic material to each other through the chemical film.

[25] A printed wiring board including two materials selected from the group consisting of a metal, an inorganic material and a resin material, bonded through a chemical film formed from the surface treatment solution described in the above [4].

[26] A semiconductor wafer including two materials selected from the group consisting of a metal, an inorganic material and a resin material, bonded through a chemical film formed from the surface treatment solution described in the above [4].

[27] An electronic device including two materials selected from the group consisting of a metal, an inorganic material and a resin material, bonded through a chemical film formed from the surface treatment solution described in the above [4].

[28] An insulating composition containing the silane coupling agent described in the above [3] and a resin material or an inorganic material.

[29] The insulating composition according to the above [28], in which the resin material is at least one selected from the group consisting of an acrylate resin, an epoxy resin, an olefin resin, a polybenzoxazole resin, a silicone resin, and a polyimide resin.

[30] The insulating composition according to the above [28], in which the inorganic material is at least one selected from the group consisting of silicon, a ceramic, a glass and an inorganic salt.

[31] An insulating material containing the insulating composition described in any one of the above [28] to [30].

[32] A printed wiring board containing an insulating layer obtained from the insulating composition described in any one of the above [28] to [30].

[33] A semiconductor wafer containing an insulating layer obtained from the insulating composition described in any one of the above [28] to [30].

[34] An electronic device containing an insulating layer obtained from the insulating composition described in any one of the above [28] to [30].

Advantageous Effects of Invention

The tetrazole silane compound of the present invention is a substance having a 1,2,3,4-tetrazole ring together with an alkoxysilylalkyl group in the molecule, and thus can be expected to provide a silane coupling agent having both functions of preventing a metal from rust, which is a feature of a tetrazole compound (azole compound), and curing an epoxy resin or a urethane resin, when used as a component.

Also, according to the surface treatment solution containing the tetrazole silane compound of the present invention, the bonding property between two materials different in the quality of material, specifically, between a metal and an inorganic material, between a metal and a resin material, and between an inorganic material and a resin material, can be enhanced.

DESCRIPTION OF EMBODIMENTS

The present invention will be described in detail hereinafter. Incidentally, the present invention is not limited to the embodiments to be described below.

Further, in the present description, "mass" has the same meaning as "weight".

Tetrazole Silane Compound

The tetrazole silane compound of the present invention is represented by the following chemical formula (I).

[Chem. 6]

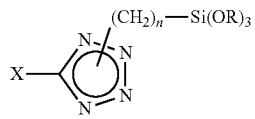
(I)

(In the formula (I), X represents a hydrogen atom, a linear or branched alkyl group having a carbon number of 1 to 12, an aryl group, an aralkyl group, an alkylthio group having a carbon number of 1 to 6, or an amino group which may have a sub stituent. n represents an integer of 1 to 12. R represents a methyl group or an ethyl group.)

Examples of the tetrazole silane compound represented by the above chemical formula (I) (hereinafter also may be referred to as tetrazole silane compound (I)) include:
1-[(trimethoxysilyl)methyl]-1H-tetrazole,
2-[(trimethoxysilyl)methyl]-2H-tetrazole,
1-[2-(triethoxysilyl)ethyl]-1H-tetrazole,
2-[2-(triethoxysilyl)ethyl]-2H-tetrazole,
1-[3-(trimethoxysilyl)propyl]-1H-tetrazole,
2-[3-(trimethoxysilyl)propyl]-2H-tetrazole,
1-[3-(triethoxysilyl)propyl]-1H-tetrazole,
2-[3-(triethoxysilyl)propyl]-2H-tetrazole,
1-[4-(triethoxysilyl)butyl]-1H-tetrazole,
2-[4-(triethoxysilyl)butyl]-2H-tetrazole,
1-[5-(triethoxysilyl)pentyl]-1H-tetrazole,
2-[5-(triethoxysilyl)pentyl]-2H-tetrazole,
1-[6-(triethoxysilyl)hexyl]-1H-tetrazole,
2-[6-(triethoxysilyl)hexyl]-2H-tetrazole,
1-[8-(triethoxysilyl)octyl]-1H-tetrazole,
2-[8-(triethoxysilyl)octyl]-2H-tetrazole,
1-[10-(triethoxysilyl)decyl]-1H-tetrazole,
2-[10-(triethoxysilyl)decyl]-2H-tetrazole,
1-[12-(triethoxysilyl)dodecyl]-1H-tetrazole,
2-[12-(triethoxysilyl)dodecyl]-2H-tetrazole,
5-methyl-1-[2-(triethoxysilyl)ethyl]-1H-tetrazole,
5-methyl-2-[2-(triethoxysilyl)ethyl]-2H-tetrazole,
5-methyl-1-[3-(trimethoxysilyl)propyl]-1H-tetrazole,
5-methyl-2-[3-(trimethoxysilyl)propyl]-2H-tetrazole,
5-methyl-1-[3-(triethoxysilyl)propyl]-1H-tetrazole,
5-methyl-2-[3-(triethoxysilyl)propyl]-2H-tetrazole,
5-methyl-1-[5-(trimethoxysilyl)pentyl]-1H-tetrazole,
5-methyl-2-[5-(trimethoxysilyl)pentyl]-2H-tetrazole,
5-methyl-1-[5-(triethoxysilyl)pentyl]-1H-tetrazole,
5-methyl-2-[5-(triethoxysilyl)pentyl]-2H-tetrazole,
5-methyl-1-[6-(triethoxysilyl)hexyl]-1H-tetrazole,
5-methyl-2-[6-(triethoxysilyl)hexyl]-2H-tetrazole,
5-methyl-1-[8-(tri ethoxysilyl)octyl]-1H-tetrazole,
5-methyl-2-[8-(tri ethoxysilyl)octyl]-2H-tetrazole,
5-ethyl-1-[3-(trimethoxysilyl)propyl]-1H-tetrazole,
5-ethyl-2-[3-(trimethoxysilyl)propyl]-2H-tetrazole,
5-propyl-1-[3-(trimethoxysilyl)propyl]-1H-tetrazole,
5-propyl-2-[3-(trimethoxysilyl)propyl]-2H-tetrazole,
5-isopropyl-1-[3-(triethoxysilyl)propyl]-1H-tetrazole,
5-isopropyl-2-[3-(triethoxysilyl)propyl]-2H-tetrazole,
5-butyl-1-[3-(triethoxysilyl)propyl]-1H-tetrazole,
5-butyl-2-[3-(triethoxysilyl)propyl]-2H-tetrazole,
5-tert-butyl-1-[3-(triethoxysilyl)propyl]-1H-tetrazole,
5-tert-butyl-2-[3-(triethoxysilyl)propyl]-2H-tetrazole,
5-pentyl-1-[3-(trimethoxysilyl)propyl]-1H-tetrazole,
5-pentyl-2-[3-(trimethoxysilyl)propyl]-2H-tetrazole,
5-hexyl-1-[3-(triethoxysilyl)propyl]-1H-tetrazole,
5-hexyl-2-[3-(triethoxysilyl)propyl]-2H-tetrazole,
5-heptyl-1-[6-(triethoxysilyl)hexyl]-1H-tetrazole,
5-heptyl-2-[6-(triethoxysilyl)hexyl]-2H-tetrazole,
5-octyl-1-[3-(triethoxysilyl)propyl]-1H-tetrazole,
5-octyl-2-[3-(triethoxysilyl)propyl]-2H-tetrazole,
5-nonyl-1-[3-(triethoxysilyl)propyl]-1H-tetrazole,
5-nonyl-2-[3-(triethoxysilyl)propyl]-2H-tetrazole,
5-decyl-1-[3-(triethoxysilyl)propyl]-1H-tetrazole,
5-decyl-2-[3-(triethoxysilyl)propyl]-2H-tetrazole,
5-undecyl-1-[3-(triethoxysilyl)propyl]-1H-tetrazole,
5-undecyl-2-[3-(triethoxysilyl)propyl]-2H-tetrazole,
5-dodecyl-1-[3-(triethoxysilyl)propyl]-1H-tetrazole,
5-dodecyl-2-[3-(triethoxysilyl)propyl]-2H-tetrazole,
5-phenyl-1-[3-(triethoxysilyl)propyl]-1H-tetrazole,
5-phenyl-2-[3-(triethoxysilyl)propyl]-2H-tetrazole,
5-(p-tolyl)-1-[3-(triethoxysilyl)propyl]-1H-tetrazole,
5-(p-tolyl)-2-[3-(triethoxysilyl)propyl]-2H-tetrazole,
5-benzyl-1-[3-(triethoxysilyl)propyl]-1H-tetrazole,
5-benzyl-2-[3-(triethoxysilyl)propyl]-2H-tetrazole,
5-phenethyl-1-[3-(trimethoxysilyl)propyl]-1H-tetrazole,
5-phenethyl-2-[3-(trimethoxysilyl)propyl]-2H-tetrazole,
5-methylthio-1-[3-(triethoxysilyl)propyl]-1H-tetrazole,
5-methylthio-2-[3-(triethoxysilyl)propyl]-2H-tetrazole,
5-ethylthio-1-[3-(tri ethoxysilyl)propyl]-1H-tetrazole,
5-ethylthio-2-[3-(tri ethoxysilyl)propyl]-2H-tetrazole,
5-propylthio-1-[4-(triethoxysilyl)butyl]-1H-tetrazole,
5-propylthio-2-[4-(triethoxysilyl)butyl]-2H-tetrazole,
5-isopropylthio-1-[4-(triethoxysilyl)butyl]-1H-tetrazole,
5-isopropylthio-2-[4-(triethoxysilyl)butyl]-2H-tetrazole,
5-butylthio-1-[4-(triethoxysilyl)butyl]-1H-tetrazole,
5-butylthio-2-[4-(triethoxysilyl)butyl]-2H-tetrazole,
5-pentylthio-1-[4-(tri ethoxysilyl)butyl]-1H-tetrazole,
5-pentylthio-2-[4-(tri ethoxysilyl)butyl]-2H-tetrazole,
5-hexylthio-1[2-(trimethoxysilypethyl]-1H-tetrazole,
5-hexylthio-2-[2-(trimethoxysilypethyl]-2H-tetrazole,
5-amino-1-[(trimethoxysilyl)methyl]-1H-tetrazole,
5-amino-2-[(trimethoxysilyl)methyl]-2H-tetrazole,
5-amino-1-[2-(triethoxysilyl)ethyl]-1H-tetrazole,
5-amino-2-[2-(triethoxysilyl)ethyl]-2H-tetrazole,
5-amino-1-[3-(trimethoxysilyl)propyl]-1H-tetrazole,
5-amino-2-[3-(trimethoxysilyl)propyl]-2H-tetrazole,
5-amino-1-[3-(triethoxysilyl)propyl]-1H-tetrazole,
5-amino-2-[3-(triethoxysilyl)propyl]-2H-tetrazole, 5-amino-1-[4-(tri ethoxysilyl)butyl]-1H-tetrazole,
5-amino-2-[4-(tri ethoxysilyl)butyl]-2H-tetrazole,
5-amino-1-[5-(trimethoxysilyl)pentyl]-1H-tetrazole,
5-amino-2-[5-(trimethoxysilyl)pentyl]-2H-tetrazole,
5-amino-1-[5-(triethoxysilyl)pentyl]-1H-tetrazole,
5-amino-2-[5-(triethoxysilyl)pentyl]-2H-tetrazole,
5-amino-1-[6-(triethoxysilyl)hexyl]-1H-tetrazole,
5-amino-2-[6-(triethoxysilyl)hexyl]-2H-tetrazole,
5-amino-1-[8-(triethoxysilyl)octyl]-1H-tetrazole,
5-amino-2-[8-(triethoxysilyl)octyl]-2H-tetrazole,
5-amino-1-[10-(triethoxysilyl)decyl]-1H-tetrazole,
5-amino-2-[10-(triethoxysilyl)decyl]-2H-tetrazole,
5-amino-1-[12-(triethoxysilyl)dodecyl]-1H-tetrazole,
5-amino-2-[12-(triethoxysilyl)dodecyl]-2H-tetrazole,
5-methylamino-1-[3-(trimethoxysilyl)propyl]-1H-tetrazole,
5-methylamino-2-[3-(trimethoxysilyl)propyl]-2H-tetrazole,
5-ethylamino-1-[3-(triethoxysilyl)propyl]-1H-tetrazole,
5-ethylamino-2-[3-(triethoxysilyl)propyl]-2H-tetrazole,
5-phenylamino-1-[3-(triethoxysilyl)propyl]-1H-tetrazole,
5-phenylamino-2-[3-(triethoxysilyl)propyl]-2H-tetrazole,
5-acetamide-1-[3-(triethoxysilyl)propyl]-1H-tetrazole,
5-acetamide-2-[3-(triethoxysilyl)propyl]-2H-tetrazole,
5-guanidino-1-[3-(triethoxysilyl)propyl]-1H-tetrazole,
5-guanidino-2-[3-(triethoxysilyl)propyl]-2H-tetrazole, and the like.

Among these tetrazole silane compounds (I), preferred are 1-[3-(trimethoxysilyl)propyl]-1H-tetrazole, 2-[3-(trimethoxysilyl)propyl]-2H-tetrazole, 1-[3-(triethoxysilyl)propyl]-1H-tetrazole, 2-[3-(triethoxysilyl)propyl]-2H-tetrazole, 5-methyl-1-[3-(trimethoxysilyl)propyl]-1H-tetrazole, 5-methyl-2-[3-(trimethoxysilyl)propyl]-2H-tetrazole, 5-phenyl-1-[3-(triethoxysilyl)propyl]-1H-tetrazole, 5-phenyl-2-[3-(triethoxysilyl)propyl]-2H-tetrazole, 5-benzyl-1-[3-(triethoxysilyl)propyl]-1H-tetrazole, 5-b enzyl-2-[3-(triethoxysilyl)propyl]-2H-tetrazole, 5-methylthio-1-[3-(triethoxysilyl)propyl]-1H-tetrazole, 5-methylthio-2-[3-(triethoxysilyl)propyl]-2H-tetrazole, 5-amino-1-[3-(trimethoxysilyl)propyl]-1H-tetrazole, 5-amino-2-[3-(trimethoxysilyl)propyl]-2H-tetrazole, 5-amino-1-[3-(triethoxysilyl)propyl]-1H-tetrazole, and 5-amino-2-[3-(triethoxysilyl)propyl]-2H-tetrazole.

In the case where the tetrazole silane compound (I) of the present invention is used as a component of a silane coupling agent described later, different types of tetrazole silane compounds may be used in combination.

In addition, by reacting a halogenated alkylsilane compound represented by the following chemical formula (III), a tetrazole compound in a mixed state of isomers such as a 1H-tetrazole compound and a 2H-tetrazole compound may be obtained and used. The mixing ratio of the 1H-tetrazole compound to the 2H-tetrazole compound is preferably from 0:100 to 100:0. From the viewpoint of production cost, the mixing ratio (molar ratio) is more preferably from 5:95 to 95:5, and still more preferably from 30:70 to 70:30.

The tetrazole silane compound represented by the chemical formula (I) of the present invention can be obtained by reacting a tetrazole compound represented by the following chemical formula (II) (hereinafter also may be referred to as a tetrazole compound (II)) with a halogenated alkylsilane compound represented by the following chemical formula (III) (hereinafter also may be referred to as a halogenated alkylsilane compound (III)).

[Chem. 7]

(In the formula (II), X represents a hydrogen atom, a linear or branched alkyl group having a carbon number of 1 to 12, an aryl group, an aralkyl group, an alkylthio group having a carbon number of 1 to 6, or an amino group which may have a substituent.)

[Chem. 8]

(In the formula (III), Hal represents a chlorine atom, a bromine atom or an iodine atom. n represents an integer of 1 to 12. R represents a methyl group or an ethyl group.)

Specifically, as shown in the following reaction scheme (A), the tetrazole silane compound (I) can be synthesized generally in a high yield by reacting the tetrazole compound (II) with the halogenated alkylsilane compound (III) in the presence of a dehydrohalogenation agent in an appropriate amount of a reaction solvent at an appropriate reaction temperature for an appropriate reaction time.

In this reaction, "5-X-1-(trialkoxysilyl)alkyl-1H-tetrazole" represented by the chemical formula (Ia) in which an alkoxysilylalkyl group is bonded to the N atom at 1-position of the tetrazole ring and "5-X-2-(trialkoxysilyl)alkyl-2H-tetrazole" represented by the chemical formula (Ib) in which a silylalkyl group are bonded to the N atom at 2-position of the tetrazole ring, are produced in a concerted manner.

[Chem. 9]

Reaction scheme (A)

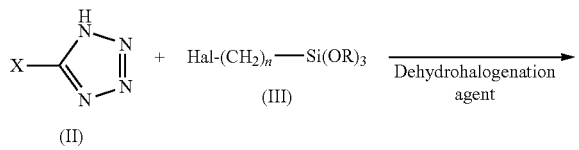

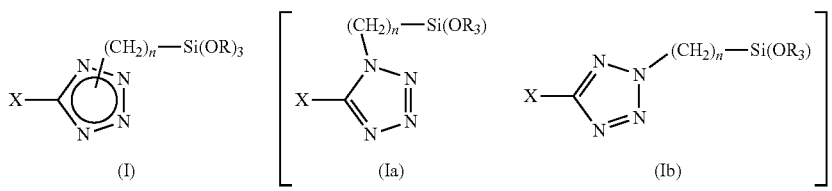

(In the formulas (I) to (III), (Ia) and (Ib), X, R, Hal and n have the same meanings as described above.)

Examples of the tetrazole compound represented by the above chemical formula (II) include:
1H-tetrazole,
5-methyl-1H-tetrazole,
5-ethyl-1H-tetrazole,
5-propyl-1H-tetrazole,
5-isopropyl-1H-tetrazole,
5-butyl-1H-tetrazole,
5-tert-butyl-1H-tetrazole,
5-pentyl-1H-tetrazole,
5-hexyl-1H-tetrazole,
5-heptyl-1H-tetrazole,
5-octyl-1H-tetrazole,
5-nonyl-1H-tetrazole,
5-decyl-1H-tetrazole,
5-undecyl-1H-tetrazole,
5-dodecyl-1H-tetrazole,
5-phenyl-1H-tetrazole,
5-(p-tolyl)-1H-tetrazole,
5-benzyl-1H-tetrazole,
5-phenethyl-1H-tetrazole,
5-methylthio-1H-tetrazole,
5-ethylthio-1H-tetrazole,
5-propylthio-1H-tetrazole,
5-isopropylthio-1H-tetrazole,
5-butylthio-1H-tetrazole,
5-pentylthio-1H-tetrazole,
5-hexylthio-1H-tetrazole,
5-amino-1H-tetrazole,
5-methylamino-1H-tetrazole,
5-ethylamino-1H-tetrazole,
5-phenylamino-1H-tetrazole,
5-acetamide-1H-tetrazole,
5-guanidino-1H-tetrazole, and the like.

Examples of the halogenated alkylsilane compound represented by the above chemical formula (III) include:
1-chloromethyltrimethoxysilane,
1-chloromethyltriethoxysilane,
2-chloroethyltrimethoxysilane,
2-chloroethyltriethoxysilane,
3-chloropropyltrimethoxysilane,
3-chloropropyltriethoxysilane,
3-bromopropyltrimethoxysilane,
3-bromopropyltriethoxysilane,
3-iodopropyltrimethoxysilane,
3-iodopropyltriethoxysilane,
4-bromobutyltrimethoxysilane,
4-bromobutyltriethoxysilane,
5-bromopentyltrimethoxysilane,
5-bromopentyltriethoxysilane,
6-bromohexyltrimethoxysilane,
6-bromohexyltriethoxysilane,
8-bromooctyltrimethoxysilane,
8-bromooctyltriethoxysilane,
10-bromodecyltrimethoxysilane,
10-bromodecyltriethoxysilane,
12-bromododecyltrimethoxysilane,
12-bromododecyltriethoxysilane, and the like.

The reaction solvent is not particularly limited and can be used as long as it is a solvent inert to the tetrazole compound (II) and the halogenated alkylsilane compound (III) as raw materials, and examples thereof includes:
a hydrocarbon solvent such as hexane, toluene and xylene;
an ether solvent such as diethyl ether, tetrahydrofuran, dioxane, and cyclopentyl methyl ether;
an ester solvent such as ethyl acetate and butyl acetate;
an alcohol solvent such as methanol and ethanol;
an amide solvent such as N,N-dimethylformamide, N,N-dimethylacetamide and N-methylpyrrolidone;
a ketone solvent such as acetone, methyl ethyl ketone, methyl isobutyl ketone, and cyclohexanone;
acetonitrile; dimethyl sulfoxide; hexamethylphosphoramide; and the like.

Examples of the dehydrohalogenation agent include:
an alkali metal alkoxide such as sodium methoxide, sodium ethoxide, potassium methoxide, and potassium tert-butoxide;
an alkali carbonate such as sodium carbonate, sodium hydrogen carbonate and potassium hydrogen carbonate;
an organic base such as diazabicycloundecene; sodium hydride; and the like.

The synthesis reaction of the tetrazole silane compound (I) of the present invention proceeds stoichiometrically as shown in the reaction scheme (A). It is preferred that the use amount (charge amount) of the halogenated alkylsilane compound (III) to the use amount (charge amount) of the tetrazole compound (II) as raw materials is set to an appropriate ratio in a range of from 0.8 to 1.2 times by mole in consideration of factors such as the kinds of raw materials and reaction solvent used and the reaction scale, as well as the reaction temperature and the reaction time.

In the case where the charge amount of the halogenated alkylsilane compound (III) is larger than 1.2 times by mole, there is a possibility that the compound is polymerized to be gelled, whereas in the case of lower than 0.8 times by mole, there is a possibility that purity of the product is lowered, separation operation of the product becomes cumbersome, or the like.

Also, since the dehydrohalogenation agent is used for the purpose of neutralizing hydrogen halide by produced in the reaction of the tetrazole compound (II) with the halogenated alkylsilane compound (III), the use amount (charge amount) thereof may be equimolar or more to the use amount of the halogenated alkylsilane compound (III).

The reaction temperature is not particularly limited, and is preferably set in a range of from 0 to 150° C., and more preferably set in a range of from 5 to 100° C., from the viewpoint of promoting the reaction smoothly (efficiently).

The reaction time is appropriately determined depending on the set reaction temperature, and is preferably set in a range of from 30 minutes to 24 hours, and more preferably set in a range of from 4 to 20 hours.

Silane Coupling Agent

The tetrazole silane compound of the present invention is suitable as a silane coupling agent.

The silane coupling agent of the present invention contains a tetrazole silane compound represented by the following chemical formula (IV) (hereinafter also may be referred to as tetrazole silane compound (IV)) as a component.

[Chem. 10]

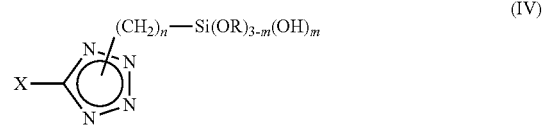

(IV)

(In the formula (IV), X represents a hydrogen atom, a linear or branched alkyl group having a carbon number of 1 to 12, an aryl group, an aralkyl group, an alkylthio group having a carbon number of 1 to 6, or an amino group which may have a substituent. n represents an integer of 1 to 12. R represents a methyl group or an ethyl group. m represents 0 or an integer of 1 to 3.)

In using the silane coupling agent containing the tetrazole silane compound (IV) of the present invention as a component, a similar method to in the case of using a conventional silane coupling agent can be employed.

Examples of the method used for surface treatment (surface modification) of a base material include: (a) a method of spray-coating a treatment solution prepared by diluting (dissolving/dispersing) an appropriate amount of a silane coupling agent with an organic solvent or a mixed solution of an organic solvent and water onto a base material; (b) a method of immersing a base material into the treatment solution; and the like.

In addition, (c) a method of further heating the surface-treated base material in order to enhance the effect of the surface treatment is also included.

In the case where the silane coupling agent of the present invention is used for a surface treatment of a base material, it can be expected that the lipophilicity of the surface of the base material is increased, and the affinity (bonding property, adhesion property) to resins and the like is improved.

Examples of the organic solvent include:

a hydrocarbon solvent such as benzene, toluene, xylene, heptane, hexane, cyclohexane, and n-octane;

a halogenated hydrocarbon solvent such as dichloromethane, dichloroethane, carbon tetrachloride, chloroform, chlorobenzene, dichlorobenzene, and trichlorobenzene;

a ketone solvent such as acetone, methyl ethyl ketone and methyl isobutyl ketone;

an ether solvent such as diethyl ether, tetrahydrofuran, dioxane, ethylene glycol monomethyl ether (methyl cellosolve), ethylene glycol monoethyl ether (ethyl cellosolve), ethylene glycol monobutyl ether, and diethylene glycol monobutyl ether; and an alcohol solvent such as methanol, ethanol, 1-propanol, 2-propanol, n-butyl alcohol, 2-butyl alcohol, tert-butyl alcohol, ethylene glycol, diethylene glycol, and propylene glycol.

Examples of the base material include: a base material having granular form, needle form, fibrous form, woven fabric form, plate form, foil form, amorphous form, or the like, made of a metal, an inorganic material or a resin material.

Examples of the metal include: copper, aluminum, titanium, nickel, tin, iron, silver, gold, and alloys thereof. It is preferable to use at least one selected from the group consisting of these metals. A plate, foil, plating film and the like made of the metal can be used as the base material.

As a specific example of the alloy, a copper alloy is not particularly limited as long as it is an alloy containing copper, and examples thereof include: a Cu—Ag alloy, a Cu—Te alloy, a Cu—Mg alloy, a Cu—Sn alloy, a Cu—Si alloy, a Cu—Mn alloy, a Cu—Be—Co alloy, a Cu—Ti alloy, a Cu—Ni—Si alloy, a Cu—Zn—Ni alloy, a Cu—Cr alloy, a Cu—Zr alloy, a Cu—Fe alloy, a Cu—Al alloy, a Cu—Zn alloy, a Cu—Co alloy, and the like.

Also, examples of other alloys include an aluminum alloy (an Al—Si alloy), a nickel alloy (a Ni—Cr alloy), an iron alloy (a Fe—Ni alloy, stainless steel, steel), and the like.

Among these metals, copper and a copper alloy are preferred.

Examples of the inorganic material include: silicon; a ceramic; a carbon used as a filler; an inorganic salt; a glass; and the like.

Specific examples thereof include: silicon; a silicon compounds such as silicon carbide, silica, glass, a diatomaceous earth, calcium silicate, a talc, a glass bead, a sericite activated white earth, bentonite, an aluminosilicate salt, and mica; an oxide such as alumina, zinc oxide, iron oxide, magnesium oxide, tin oxide, and titanium oxide; a hydroxide such as magnesium hydroxide, aluminum hydroxide and basic magnesium carbonate; a carbonate such as calcium carbonate, zinc carbonate, hydrotalcite, and magnesium carbonate; a sulfate such as barium sulfate and gypsum; a titanate such as barium titanate; a nitride such as aluminum nitride and silicon nitride; a graphite such as flake graphite (natural graphite), expanded graphite, and expanded graphite (synthetic graphite); an activated carbon; a carbon fiber; carbon black; and the like.

Among the inorganic materials, it is preferred to be selected from the group consisting of silicon, a ceramic (such as alumina, silicon carbide, aluminum nitride, silicon nitride, and barium titanate), a glass, and an inorganic salt.

Examples of the resin material include: Nylon, an acrylate resin, an epoxy resin, an olefin resin, a polybenzoxazole resin, a silicone resin, a polyimide resin, a bismaleimide resin, a maleimide resin, a cyanate resin, a polyphenylene ether resin, a polyphenylene oxide resin, an olefin resin, a fluorine-containing resin, a polyetherimide resin, a polyether ether ketone resin, a liquid crystal resin, and the like, and also include a combination thereof by mixing the above materials or modifying with each other.

Among these resin materials, it is preferred to be selected from the group consisting of an acrylate resin, an epoxy resin, an olefin resin, a polybenzoxazole resin, a silicone resin, and a polyimide resin.

In the case where such a surface treatment is applied to the base material, it is possible to improve affinity (bonding property, adhesion property) to resins and the like owing to increased lipophilicity of the surface of the base material.

In order to enhance the effect of the treatment, the surface-treated base material may be further subjected to a heat treatment.

Surface Treatment Solution

The surface treatment solution of the present invention is a surface treatment solution containing the tetrazole silane compound (IV), and the tetrazole silane compound (IV) encompasses tetrazole silane compounds represented by the following chemical formula (I) and chemical formulas (IVa) to (IVc).

[Chem. 11]

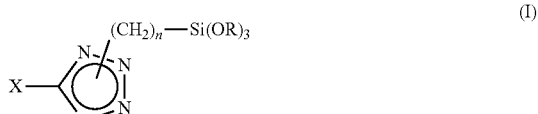

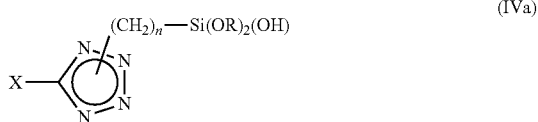

-continued

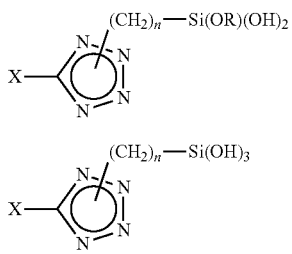

(IVb)

(IVc)

(In the formulas, X, R and n have the same meanings as described above.)

That is, the tetrazole silane compound (I) is a tetrazole silane compound (trialkoxy) where m is 0 in the above described chemical formula (IV).

Similarly, the tetrazole silane compound represented by the chemical formula (IVa) (hereinafter also may be referred to as tetrazole silane compound (IVa)) is a tetrazole silane compound where m is 1; the tetrazole silane compound represented by the chemical formula (IVb) (hereinafter also may be referred to as tetrazole silane compound (IVb)) is a tetrazole silane compound where m is 2; and the tetrazole silane compound represented by the chemical formula (IVc) (hereinafter also may be referred to as tetrazole silane compound (IVc)) is a tetrazole silane compound where m is 3.

The tetrazole silane compounds (IVa) to (IVc) are species generated by hydrolysis of the tetrazole silane compound (I) present in the surface treatment solution, and they, as well as the tetrazole silane compound (I) which is a trialkoxy, are suitable as a component of the silane coupling agent. Also, the tetrazole silane compounds (IVa) to (IVc) can be used after extracting from the surface treatment solution by, for example, removing volatile contents from the surface treatment solution.

In the practice of the present invention, it is preferred to use the tetrazole silane compound (I) as a raw material for preparing the surface treatment solution.

Examples of the tetrazole silane compound (I) are as described above.

The surface treatment solution of the present invention can be prepared by mixing the tetrazole silane compound (I) of the present invention represented by the above chemical formula (I) with an organic solvent or the tetrazole silane compound (I) with a solubilizing agent and water. Examples of the solubilizing agent include an acid, an alkali and an organic solvent. One kind of these solubilizing agents may be used alone, or two or more kinds thereof may be used in combination.

As to the preparation method of the surface treatment solution in the case where a solubilizing agent and water are used, the solubilizing agent may be added after mixing the tetrazole silane compound with water, a mixed solution of water and the solubilizing agent may be mixed and added to the tetrazole silane compound, or water may be added after mixing the tetrazole silane compound with the solubilizing agent.

As the water used for the preparation of the surface treatment solution, pure water such as ion exchanged water or distilled water is preferred.

Examples of the acid include: a mineral acid such as hydrochloric acid, sulfuric acid and nitric acid; an organic acid such as formic acid, acetic acid, propionic acid, butyric acid, 2-ethylbutyric acid, valeric acid, caproic acid, enanthic acid, caprylic acid, pelargonic acid, capric acid, lauric acid, myristic acid, palmitic acid, margaric acid, oleic acid, stearic acid, glycolic acid, lactic acid, gluconic acid, glyceric acid, malonic acid, succinic acid, levulinic acid, benzoic acid, oxalic acid, tartaric acid, malic acid, and amino acid; and the like. One kind of these acids may be used alone, or two or more kinds thereof may be used in combination.

Examples of the alkali include: a hydroxide of an alkali metal, such as sodium hydroxide and potassium hydroxide; an amine such as ammonia, methylamine, dimethylamine, trimethylamine, ethylamine, diethylamine, triethylamine, propylamine, isopropylamine, butylamine, pentyl amine, hexylamine, heptylamine, octylamine, nonylamine, allylamine, ethylenediamine, diethylenetriamine, triethylenetramine, monoethanolamine, diethanolamine, triethanolamine, monopropanolamine, dipropanolamine, tripropanolamine, monoisopropanolamine, diisopropanolamine, triisopropanolamine, 2-amino-1-propanol, N,N-dimethylethanolamine, cyclohexylamine, aniline, pyrrolidine, piperidine, piperazine, and pyridine; and the like. One kind of these alkalis may be used alone, or two or more kinds thereof may be used in combination.

Examples of the organic solvent include: methanol, ethanol, 1-propanol, 2-propanol, butanol, tert-butyl alcohol, ethylene glycol, propylene glycol, 1,4-butanediol, glycerin, diethylene glycol, triethylene glycol, ethylene glycol monomethyl ether, ethylene glycol dimethyl ether, ethylene glycol monoethyl ether, ethylene glycol diethyl ether, ethylene glycol monobutyl ether, propylene glycol monomethyl ether, propylene glycol monoethyl ether, propylene glycol monobutyl ether, diethylene glycol monomethyl ether, diethylene glycol dimethyl ether, diethylene glycol monoether ether, diethylene glycol diethyl ether, diethylene glycol monobutyl ether, triethylene glycol dimethyl ether, triethylene glycol diethyl ether, tetrahydrofurfuryl alcohol, furfuryl alcohol, acetone, tetrahydrofuran, dioxane, acetonitrile, 2-pyrrolidone, formamide, dimethylformamide, dimethylacetamide, dimethyl sulfoxide, sulfolane, dimethyl carbonate, ethylene carbonate, N-methylpyrrolidone, γ-butyrolactone, 1,3-dimethyl-2-imidazolidinone, and the like. One kind of these organic solvents may be used alone, or two or more kinds thereof may be used in combination.

The content of the solubilizing agent is preferably 0.1 to 50% by mass in the surface treatment solution. In the case where the content of the solubilizing agent is 0.1% by mass or more, the action of enhancing the solubility of the tetrazole silane compound in the surface treatment solution is remarkable. Moreover, since exceeding 50% by mass is not economical, it is preferable to make 50% by mass an upper limit. The content of the solubilizing agent is more preferably 0.5% by mass or more and still preferably 1% by mass or more, and more preferably 30% by mass or less and still more preferably 15% by mass or less, in the surface treatment solution.

Hydrolysis of Tetrazole Silane Compound

The tetrazole silane compound (I) of the present invention is hydrolyzed upon being brought into contact with water as described above, and an embodiment of the hydrolysis is shown in the scheme (B).

The scheme (B) indicates an embodiment where the silyl group included in the tetrazole silane compounds (I), (IVa) and (IVb) is hydrolyzed, that is, the trialkoxysilyl group is progressively changed to a dialkoxyhydroxysilyl group, a dihydroxyalkoxysilyl group, and a trihydroxysilyl group.

[Chem. 12]

Scheme (B)

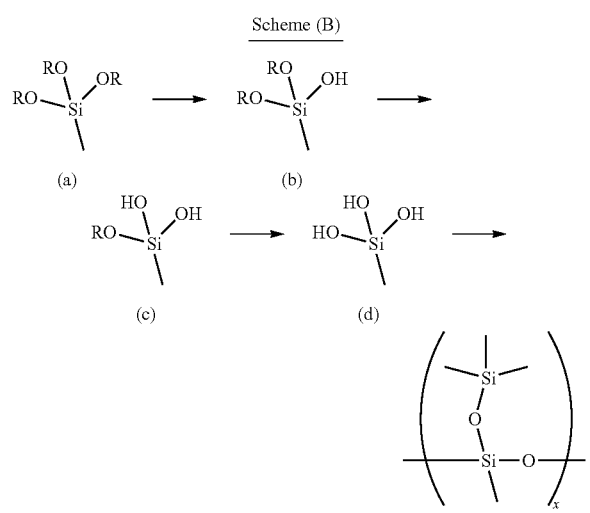

In general, it is known that a substance having an alkoxysilyl group in its molecule acts as a silane coupling agent.

For example, when the bonding between copper and a resin material is cited as an example, the tetrazole silane compound used in the practice of the present invention has a tetrazole ring and an alkoxysilyl group (—Si—OR) in the molecule thereof and the tetrazole ring interacts with the resin and copper to form a chemical bond.

Also, the alkoxysilyl group is subjected to hydrolysis to be converted into a hydroxysilyl group (—Si—OH), and the hydroxysilyl group chemically bonds to copper oxide dotting on the surface of copper.

Therefore, when the surface treatment solution is brought into contact with copper, a chemical film derived from the tetrazole silane compound (IV) is formed due to the bonding of the tetrazole ring and hydroxysilyl group on the surface of the copper. And in the case where a resin layer composed of a resin material is formed on the surface of the chemical film, the bonding property between the copper and the resin material can be enhanced in comparison with the case of directly forming the rein layer on the surface of copper.

In the practice of the present invention, the concentration of the tetrazole silane compound (IV) in the surface treatment solution is preferably from 0.001 to 10% by mass, and more preferably from 0.01 to 5% by mass, calculated in terms of the concentration of the tetrazole silane compound (I) which is a trialkoxy.

In the case where the concentration is less than 0.001% by mass, the effect of improving the bonding property is not sufficient, whereas in the case where the concentration exceeds 10% by mass, the effect of improving the bonding property becomes almost plateau and it is not economical to further increase the amount of the tetrazole silane compound used.

The tetrazole silane compounds (IVa) to (IVc) having a hydroxysilyl group, generated in the surface treatment solution gradually react with each other to cause dehydration condensation, and the hydroxysilyl groups form a siloxane bond (Si—O—Si) (see the scheme (B)), thereby being converted into a hardly water soluble silane oligomer (tetrazole silane compound having a group represented by the chemical formula (e) in the scheme (B)). Incidentally, X of the group represented by the chemical formula (e) is an integer denoting the number of the repeating units.

When the amount of the silane oligomer generated in the surface treatment solution becomes large, there is a possibility that the insoluble matter precipitates (the treatment solution becomes white turbid) and adheres to a treatment tank, pipes connected to the treatment tank, and sensors which are immersed in the treatment solution and detect the temperature and liquid level of the treatment solution, to thereby inhibit smooth surface treatment.

In order to avoid this, in the preparation of the surface treatment solution, it is preferred to incorporate an organic solvent into the surface treatment solution, as a solubilizing agent for the hardly water soluble silane oligomer. In addition, in the preparation of the surface treatment solution, an acid or an alkali is preferably incorporated in order to accelerate the dissolution of the tetrazole silane compound. Incidentally, since the organic solvent also has a function of enhancing the solubility of the tetrazole silane compound, it is preferable to incorporate at least one kind selected from the group consisting of an acid, an alkali and an organic solvent as a solubilizing agent into the surface treatment solution of the present invention.

Similarly, a substance generating a halogen ion such as a chlorine ion, a bromine ion or an iodine ion or a metal ion such as a copper ion, an iron ion or a zinc ion can be used in order to improve the stability of the surface treatment solution and the uniformity of the chemical film.

Also, a known coupling agent may be used in combination as long as the effect of the present invention is not impaired. Examples of the known coupling agent include a silane coupling agent having a thiol group (mercapto group), a vinyl group, an epoxy group, a (meth)acryl group, an amino group, or a chloropropyl group. Here, (meth)acryl means acryl or methacryl.

Examples of such a silane coupling agent include:

a mercaptosilane compound such as 3-mercaptopropyltrimethoxysilane and 3-mercaptopropylmethyldimethoxysilane;

a vinylsilane compound such as vinyltrichlorosilane, vinyltrimethoxysilane and vinyltriethoxysilane;

a styrylsilane compound such as p-styryltrimethoxysilane;

an epoxysilane compound such as 2-(3,4-epoxycyclohexyl)ethyltrimethoxysilane, 3-glycidoxypropyltrimethoxysilane, 3-glycidoxypropylmethyldiethoxysilane, and 3-glycidoxypropyltriethoxysilane;

an acryloxysilane compound such as 3-acryloxypropyltrimethoxysilane;

a methacryloxysilane compound such as methacryloxypropylmethyldimethoxysilane, methacryloxypropyltrimethoxysilane, methacryloxypropylmethyldiethoxysilane, and methacryloxypropyltriethoxysilane;

an aminosilane compound such as N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, and N-(vinylbenzyl)-2-aminoethyl-3-aminopropyltrimethoxysilane;

an ureidosilane compound such as 3-ureidopropyltriethoxysilane;

a chloropropylsilane compound such as 3-chloropropyltrimethoxysilane;

a sulfide silane compound such as bis(triethoxysilylpropyl) tetrasulfide;

an isocyanatosilane compound such as 3-isocyanatopropyltriethoxysilane; and the like.

In addition, an aluminum coupling agent, a titanium coupling agent, a zirconium coupling agent, and the like can also be exemplified.

Treatment Method

The method for bringing the surface treatment solution of the present invention into contact with a surface of a base material is not particularly limited, and a means such as spraying, immersion or coating can be adopted in the same manner as in the case of the silane coupling agent described above.

The time (treatment time) for bringing the surface treatment solution into contact with a base material is preferably from 1 second to 10 minutes and more preferably from 5 seconds to 3 minutes. In the case where the treatment time is shorter than 1 second, a film thickness of the chemical film formed on the surface of the base material is thin and the bonding force between the materials different in the quality of material cannot be sufficiently obtained, whereas even in the case where the time is longer than 10 minutes, no significant difference in the film thickness of the chemical film is observed and also further improvement in the bonding property cannot be expected.

Also, the temperature of the surface treatment solution when bringing the surface treatment solution into contact with the surface of a base material is preferably from 5 to 50° C., and it can be appropriately set depending on the relation with the treatment time described above.

After bringing the surface treatment solution of the present invention into contact with a base material, drying may be performed after washing with water, or drying may be performed without washing with water.

The drying is preferably performed at a temperature of from room temperature to 150° C.

The water used for the washing with water is preferably pure water such as ion exchanged water or distilled water. The method for the washing with water and its time are not particularly limited and it may be performed by means of spraying, immersion or the like, for an appropriate time.

In the present invention, the surface of the chemical film may be modified by treating the dried chemical film with plasma, laser, ion beam, ozone, heating, humidification, or the like. Alternatively, the metal surface may be cleaned for the purpose of removing resin/ion residue, by using plasma, laser, ion beam, mechanical polishing such as pumice brush, or processing with drill or the like.

Prior to bringing the surface treatment solution of the present invention into contact with a surface of copper or a copper alloy (hereinafter, both may be also simply refer to as copper), at least one pre-treatment selected from an acid pickling treatment, an alkali treatment, a roughening treatment, a heat resistant treatment, a rust prevention treatment, and a chemical conversion treatment may be performed on the surface of the copper.

The acid pickling treatment is carried out in order to remove an oil component attached to the surface of copper and in order to remove an oxide film on the surface of copper. For this acid pickling treatment, use can be made of solutions such as a hydrochloric acid solution, a sulfuric acid solution, a nitric acid solution, a sulfuric acid-hydrogen peroxide solution, an organic acid solution, an inorganic acid-organic solvent solution, and an organic acid-organic solvent solution.

The alkali treatment is carried out in order to remove oil and fat components attached to the surface of copper and in order to remove the residue of a previous step (e.g., a dry film resist for forming a copper circuit). For this alkali treatment, use can be made of solutions such as an aqueous solution or an organic solvent solution, containing an alkali metal hydroxide such as sodium hydroxide or potassium hydroxide, an amine such as ammonia, ethanolamine, monopropanolamine, or tetramethylammonium hydroxide, sodium carbonate, sodium hydrogen carbonate, potassium carbonate, potassium hydrogen carbonate, ammonium carbonate, ammonium hydrogen carbonate, sodium acetate, potassium acetate, sodium phosphate, disodium hydrogen phosphate, potassium phosphate, dipotassium hydrogen phosphate, or the like.

The roughening treatment is carried out in order to enhance the bonding property between copper and a resin due to the anchor effect, and the surface of copper is provided with an uneven shape, whereby the adhesion property between the copper and a resin material can be enhanced. In this roughening treatment, use can be made of methods such as a micro-etching method, an electroplating method, electroless plating method, an oxidation method (black oxide, brown oxide), an oxidation/reduction method, a brush polishing method, and a jet scrub method.

In the micro-etching method, for example, use can be made of an organic acid-cupric ion etching agent, a sulfuric acid-hydrogen peroxide etching agent, a persulfate etching agent, a copper chloride etching agent, and an iron chloride etching agent. In the electroplating method, unevenness is formed on the surface of copper by depositing fine copper particles on the surface of copper.

In the heat resistance treatment, a film of at least one selected from nickel, nickel-phosphorus, zinc, zinc-nickel, copper-zinc, copper-nickel, copper-nickel-cobalt, and nickel-cobalt is formed on the surface of copper. The formation of this film can be carried out by using a known method by electroplating, but it is not limited to electroplating, and there is no problem even if vapor deposition or other means is used.

The rust prevention treatment is carried out in order to prevent oxidative corrosion of the copper surface, and use can be made of a method of forming a plated film of zinc or a zinc alloy composition or a plated film of electrolytic chromate on the copper surface. Furthermore, a treatment solution containing an organic compound rust inhibitor such as a benzotriazole rust inhibitor may be brought into contact with the surface of copper.

In the chemical conversion treatment, use can be made of a method of forming a passive film of tin or a method of forming a passive film of copper oxide.

Prior to bringing the surface treatment solution of the present invention into contact with a surface of copper, an aqueous solution containing a copper ion may be brought into contact with the surface of copper. The aqueous solution containing a copper ion has a function of making the thickness of the chemical film formed on the surface of copper uniform.

The copper ion source in the aqueous solution containing a copper ion is not particularly limited as long as it is a water-soluble copper salt, and examples thereof include a copper salt such as copper sulfate, copper nitrate, copper chloride, copper formate, and copper acetate. In order to solubilize the copper salt in water, ammonia, hydrochloric acid or the like may be added.

After bringing the surface treatment solution of the present invention into contact with the surface of copper, an aqueous acidic solution or an aqueous alkaline solution may be brought into contact with the surface of copper. Similar to the aqueous solution containing a copper ion described above, the aqueous acidic solution and the aqueous alkaline solution also have a function of making the thickness of the chemical film formed on the surface of copper uniform.

The aqueous acidic solution and the aqueous alkaline solution are not particularly limited. Examples of the aqueous acidic solution include: an aqueous solution containing a mineral acid such as sulfuric acid, nitric acid or hydrochloric acid; an aqueous solution containing an organic acid such as formic acid, acetic acid, lactic acid, glycolic acid, or an amino acid; and the like. Examples of the aqueous alkaline solution include: an aqueous solution containing an alkali metal hydroxide such as sodium hydroxide or potassium hydroxide, an amine such as ammonia, ethanolamine, monopropanolamine, or tetramethylammonium hydroxide, sodium carbonate, sodium hydrogen carbonate, potassium carbonate, potassium hydrogen carbonate, ammonium carbonate, ammonium hydrogen carbonate, sodium acetate, potassium acetate, sodium phosphate, disodium hydrogen phosphate, potassium phosphate, and dipotassium hydrogen phosphate.

Prior to bringing the surface treatment solution of the present invention into contact with the surface of copper, an aqueous solution containing a known coupling agent may be brought into contact with the surface of copper.

After the surface treatment solution of the present invention is brought into contact with the surface of copper, an aqueous solution containing a known coupling agent may be brought into contact with the surface of copper.

After the surface treatment solution of the present invention is brought into contact with the surface of copper, for example, a treatment solution containing a known organic compound rust inhibitor such as a benzotriazole rust inhibitor may be brought into contact therewith.

The surface treatment solution of the present invention can be used for treating a surface of at least one base material selected from the group consisting of the metal, inorganic material and resin material described above. In the case where the surface of the base material is treated by using the surface treatment solution of the present invention, a chemical film is formed on the surface of the base material and thus the bonding property to other materials can be enhanced.

According to the present invention, two materials selected from the group consisting of the metal, inorganic material and resin material described above can be bonded by using the surface treatment solution of the present invention. In the case where two materials are bonded to each other through a layer of the chemical film formed by the surface treatment solution of the present invention, the mutual affinity can be enhanced, so that even materials different in the quality of material can be more firmly bonded to each other.

Bonding Method

Two materials selected from the metal, inorganic material and resin material described above can be bonded to each other by using the surface treatment solution of the present invention. In the case where two materials are bonded to each other through a film formed by the surface treatment solution of the present invention, the mutual affinity can be enhanced, so that even materials different in the quality of material can be more firmly bonded to each other. The thickness of the film is preferably from 0.0001 to 1 µm, and more preferably from 0.001 to 0.5 µm.

The bonding method can be carried out by a known method. Examples thereof include a method in which the surface treatment solution of the present invention is brought into contact with a surface of a base material composed of a metal, an inorganic material or a resin material to form a chemical film, and another base material is bonded to a part or whole of the formed chemical film by using means such as coating, pressure bonding or mixing, by utilizing an adhesive or an adhesive sheet (film), or by a combination of these means.

Also, there may be mentioned a method in which the surface treatment solution of the present invention is brought into contact with surfaces of two base materials selected from a metal, an inorganic material and a resin material to form a chemical film on each of the surfaces of the two base materials, and the two base materials are bonded to each other by using means such as coating, pressure bonding or mixing, by utilizing an adhesive or an adhesive sheet (film), or by a combination of these means.

By using the surface treatment solution of the present invention, two materials, in particular, two materials different in the quality of material as described above, can be bonded to each other, so that it can be suitably utilized in various electric or electronic components and electronic devices such as a semiconductor wafer or a printed wiring board.

In the present invention, the surface treatment solution of the present invention can be suitably used to a base material formed of a metal, particularly, copper or a copper alloy. For example, it is suitable for surface treatment of cupper or a copper alloy for the purpose of enhancing bonding property (adhesion property) between a copper circuit (copper wiring layer) and a semi-cured or cured prepreg or solder resist or a semi-cured or cured dry film resist (insulating resin layer), and the bonding property between the copper wiring layer and the insulating resin layer can be enhanced in the printed wiring board having the insulating resin layer adjacent to the copper wiring layer.

In an application example in a semiconductor wafer, it is suitable for a surface treatment of a semiconductor circuit for the purpose of enhancing bonding property (adhesion property) between a semiconductor circuit formed on the semiconductor wafer and a protective film, for example, an insulating protective film such as a photosensitive positive, photosensitive negative or non-photosensitive buffer coat or bump protective film.

In addition, it is also suitable, in a package substrate (WL-CSP) in which a redistribution layer is formed on a semiconductor wafer, for a surface treatment of a copper circuit redistribution layer for the purpose of enhancing bonding property (adhesion property) between the copper circuit redistribution layer and an insulating material.

Furthermore, it is also suitable for a surface treatment of a semiconductor circuit for the purpose of enhancing bonding property (adhesion property) between a metal circuit formed on a semiconductor wafer such as IC, AP, NAND, DRAM, MCP, SiP, and MEMS or on a printed wiring board and an insulating material, for example, a sealing material such as a sealant for transfer-molding such as an epoxy molding compound (EMC) and a sealant for compression-molding, a liquid curable resin-underfilling material for filling gaps between bumps such as solder balls when flip-chip mounting on a printed circuit board or package substrate, such as a mold underfill (MUF), a capillary underfill (CUF), a non-conductive adhesive (NCP), and a non-conductive film (NCF), or a die bond paste (DBP).

In addition, it is also suitable for a conductive paste, a die attach material, a semiconductor chip-mounting material, a non-conductive adhesive, a liquid crystal sealant, a display material, a reflector, a paint, an adhesive, a varnish, an elastomer, ink, wax, or a sealant.

Examples of the protective film and the insulating material include an epoxy resin, a polyimide resin, a polybenzoxazole resin, and a silicone resin.

The printed wiring board can be produced by bringing the surface treatment solution of the present invention into contact with a surface of the copper wiring, followed by washing with water and drying, and then forming an insulating resin layer on the surface of the copper wiring. The contact method is the same as mentioned above, and immersion of the copper wiring in the surface treatment solution, spraying of the treatment solution to the copper wiring and the like are preferred because of simplicity and certainty.

Also, the method for washing with water is not particularly limited, and immersion of the copper wiring in washing water or spraying of washing water to the copper wiring surface is preferred because of simplicity and certainty.

For the formation of the insulating resin layer, a known method, for example, a method of sticking a semi-cured resin material or a means of coating a liquid resin material containing a solvent can be adopted. Subsequently, a via-hole is formed in order to conduct the upper and lower wirings. By repeating this process, a multilayer printed wiring board can be produced.

In the circuit formation method of the printed wiring board described above, an example of a semi-additive method using the surface treatment solution of the present invention will be described below.

In a method for producing a circuit substrate including at least one or more of:

(a) a step of preparing an insulating substrate having a first conductive layer on a first surface of an insulating substrate or of an insulating substrate having a through-hole and a via-hole, on a second surface opposite to the first surface, and on the inner walls of the through-hole and the via-hole;

(b) a step of forming a photocrosslinkable resin layer and a mask layer on the first surface and the second surface to cover the first conductive layer on the first surface, on the second surface and on the inner walls of the through-hole and the via-hole with the photocrosslinkable resin layer and the mask layer;

(c) a step of pattern-exposing the photocrosslinkable resin layer on the first surface, on the second surface and in the vicinity of the through-hole and the via-hole;

(d) a step of removing the mask layer on the first surface, on the second surface and in the vicinity of the through-hole and the via-hole;

(e) a step of developing and removing an uncured photocrosslinkable resin layer on the first surface, on the second surface and in the vicinity of the through-hole and the via-hole by using a photocrosslinkable resin layer-removing solution to expose the first conductive layer on the first surface, the first conductive layer on the second surface and the first conductive layer in the vicinity of the through-hole and the via-hole;

(f) a step of forming a second conductive layer on the first conductive layer exposed on the first surface, on the second surface and on the inner walls of the through-hole and the via-hole by an electrolytic plating treatment;

(g) a step of removing the cured photocrosslinkable resin layer on the first surface, on the second surface and in the vicinity of the through-hole and the via-hole, to expose the first and second conductive layers on the first surface, on the second surface and on the inner walls of the through-hole and the via-hole;

(h) a step of removing the exposed first conductive layer by flash etching;

(i) a step of forming a third conductive layer on the first and second conductive layers on the first surface, on the second surface and on the inner walls of the through-hole and the via-hole by electroless plating and electrolytic plating treatment; and (j) a step of laminating an insulating resin layer on the first, second and third conductive layers on the first surface, on the second surface and on the inner walls of the through-hole and the via-hole, the surface treatment solution of the present invention is brought into contact with at least one or more metal layers or resist layers among the first, second and third conductive layers on the first surface, on the second surface and on the inner walls of the through-hole and the via-hole, the insulating resin substrate, the photocrosslinkable resin layers used in the etching resist layer and the plating resist layer, and the insulating resin laminate, to thereby produce a printed wiring board.

Furthermore, in the circuit formation method of the printed wiring board described above, an example of a subtractive method using the surface treatment solution of the present invention will be described below.

In a method for producing a circuit substrate including at least one or more of:

(a) a step of preparing an insulating substrate having a first conductive layer on a first surface of an insulating substrate or of an insulating substrate having a through-hole and a via-hole, on a second surface opposite to the first surface, and on the inner walls of the through-hole and the via-hole;

(b) a step of forming a photocrosslinkable resin layer and a mask layer on the first surface and the second surface to cover the first conductive layer on the first surface, on the second surface and on the inner walls of the through-hole and the via-hole with the photocrosslinkable resin layer and the mask layer;

(c) a step of pattern-exposing the photocrosslinkable resin layer on the first surface, on the second surface and in the vicinity of the through-hole and the via-hole;

(d) a step of removing the mask layer on the first surface, on the second surface and in the vicinity of the through-hole and the via-hole;

(e) a step of developing and removing an uncured photocrosslinkable resin layer on the first surface, on the second surface and in the vicinity of the through-hole and the via-hole by using a photocrosslinkable resin layer-removing solution to expose the first conductive layer on the first surface, the first conductive layer on the second surface and the first conductive layer in the vicinity of the through-hole and the via-hole;

(f) a step of etching and removing the first conductive layer exposed on the first surface, on the second surface and on the inner walls of the through-hole and the via-hole;

(g) a step of removing the cured photocrosslinkable resin layer on the first surface, on the second surface and in the vicinity of the through-hole and the via-hole, to expose the first and second conductive layers on the first surface, on the second surface and on the inner walls of the through-hole and the via-hole;

(h) a step of forming a third conductive layer on the first and second conductive layers on the first surface, on the second surface and on the inner walls of the through-hole and the via-hole by electroless plating and electrolytic plating treatment; and (i) a step of laminating an insulating resin layer on the first, second and third conductive layers on the first surface, on the second surface and on the inner walls of the through-hole and the via-hole, the surface treatment solution of the present invention is brought into contact with at least one or more metal layers or resist layers among the first, second and third conductive layers on the first surface, on the second surface and on the inner walls of the through-hole and the via-hole, the insulating resin substrate, the photocrosslinkable resin layers used in the etching resist layer and the plating resist layer, and the insulating resin laminate, to thereby produce a printed wiring board.

The copper wiring and the conductive layers may be those produced by any method such as an electroless plating method, an electrolytic plating method, a vapor deposition method, a sputtering method, or a damascene method, and may contain an inner via-hole, a through-hole, a connection terminal or the like.

The "copper" according to the present invention is one used in the usage and form, such as a foil (electrolytic copper foil, rolled copper foil, resin-attached copper foil, carrier-attached copper foil, electroless copper foil, sputtered copper foil, or thin copper foil), a plating film (electroless copper-plating film or electrolytic copper-plating film), a thin film formed by a vapor deposition method, a sputtering method, a damascene method or the like, a grain, a needle, a fiber, a wire, a rod, a tube, a plate, or the like, which are used in electronic devices such as a printed wiring board and a lead frame, an ornament, a building material, or the like. In the case of a recent copper wiring through which a high frequency electric signal flows, it is preferred that the surface of copper is a smooth surface having an average roughness of 0.1 µm or less. The surface of copper may be plated with nickel, zinc, chromium, tin, or the like as a pretreatment.

Furthermore, the carrier-attached copper foil to be treated with the surface treatment solution of the present invention is an ultrathin electrolytic copper foil used for a printed wiring board including a step of forming a circuit by any method of a semi-additive method, a subtractive method, a partly additive method, and a modified semi-additive method, and contains a copper foil carrier, a peeling layer laminated on the copper foil carrier, and an ultrathin copper layer laminated on the peeling layer. The surface of copper may be subjected to at least one pretreatment selected from the group consisting of an acid pickling treatment, an alkali treatment, a roughening treatment, a heat resistance treatment, a rust prevention treatment, and a chemical conversion treatment.

Insulating Composition

An insulating composition can be formed by incorporating the silane coupling agent according to the present invention into a resin material or an inorganic material.

Also, an insulating composition can be obtained by dissolving the tetrazole silane compound (IV) in an organic solvent or the like and mixing it with a resin material or an inorganic material.

The content of the tetrazole silane compound (IV) in the insulating composition is preferably from 0.001 to 10% by mass, and more preferably from 0.01 to 5% by mass. In the case where the content of the tetrazole silane compound (IV) is less than 0.001% by mass in the insulating composition, the effect of improving the bonding property is not sufficient, whereas in the case where the concentration exceeds 10% by mass, the effect of improving the bonding property becomes almost plateau and it is not economical to further increase the amount of the tetrazole silane compound (IV) used.

The insulating composition can be produced by a known method. For example, the insulating composition can be produced by dissolving the tetrazole silane compound (IV) in an organic solvent and mixing it with a solid or liquid resin material. Also, the tetrazole silane compound (IV) may be directly added to and mixed with a liquid resin material to produce the insulating composition.

The insulating composition according to the present invention provides an insulating material having high bonding strength so that it can be suitably used in various electric or electronic components and electronic devices such as a printed wiring board.

JP-A-2009-19266 discloses an invention relating to a method for forming a film of a silane coupling agent, which includes a step of coating a liquid containing a silane coupling agent on a metal surface, a step of drying the metal surface coated with the liquid at a temperature of from 25 to 150° C. for 5 minutes or shorter time, and a step of washing with water the metal surface dried.

Also, it is described that on the metal surface, an adhesive metal layer, such as tin, may be formed with an immersion plating solution, as a surface treatment in advance.

The surface treatment solution of the present invention can be used as the liquid containing a silane coupling agent described above. The contents described in the patent publication are incorporated by reference as a part of the specification.

EXAMPLES

The present invention will be described specifically with reference to Examples (Synthesis tests, Evaluation tests) and Comparative Examples (Evaluation tests), but the present invention should not be construed as being limited thereto.

Tetrazole compounds and halogenated alkylsilane compounds used as raw materials in the synthesis tests are as follows.

Tetrazole Compound 1H-tetrazole: manufactured by Tokyo Chemical Industry Co., Ltd.

5-methyl-1H-tetrazole: manufactured by Toyobo Co., Ltd.

5-phenyl-1H-tetrazole: the same as above 5-benzyl-1H-tetrazole: manufactured by Tokyo Chemical Industry Co., Ltd.

5-methylthio-1H-tetrazole: manufactured by Wako Pure Chemical Industries 5-amino-1H-tetrazole: manufactured by Tokyo Chemical Industry Co., Ltd.

Halogenated Alkylsilane Compound 3-chloropropyltrimethoxysilane: manufactured by Shin-Etsu Chemical Co., Ltd.

3-chloropropyltriethoxysilane: manufactured by Tokyo Chemical Industry Co., Ltd.

The triazole silane compound used in Comparative Example 1 (evaluation test) is as follows.

Triazole Silane Compound

1-[3-(trimethoxysilyl)propyl]-1,2,4-triazole: synthesized in accordance with the method described in Patent Literature 2 (US-A-2012/0021232).

Example 1

Synthesis of 1-[3-(trimethoxysilyl) propyl]-1H-tetrazole and 2-[3-(trimethoxysilyl)propyl]-2H-tetrazole To a solution consisting of 14.2 g (0.203 mol) of 1H-tetrazole and 80 mL of dehydrated N,N-dimethylformamide was added 39.2 g (0.203 mol) of a 28% sodium methoxide methanol solution at room temperature, followed by stirring for 30 minutes.

Thereafter, thereto was added dropwise 40.3 g (0.203 mol) of 3-chloropropyltrimethoxysilane over 30 minutes, followed by stirring at 88 to 91° C. for 4 hours.

The reaction mixture in the form of suspension was cooled to 3° C., and the insoluble matter was removed by filtration. Then, volatile contents (solvent, etc.) were distilled off under reduced pressure, to obtain 44.2 g (0.190 mol, 93.7% yield) of a colorless liquid.

$^1$H NMR spectrum data of the obtained liquid were as follows.

$^1$H-NMR (DMSO-$d_6$) δ: 0.57 (t, 2H, J=6 Hz, —CH$_2$—Si), 1.96 (m, 2H, —CH$_2$CH$_2$—Si), 3.47 (s, 9H, SiOCH$_3$), 4.43 (t, 1.1H, J=6.8 Hz, NCH$_2$—), 4.68 (t, 0.9H, J=6.8 Hz, NCH$_2$—), 8.96 (s, 0.55H, tetrazole ring C—H), 9.41 (s, 0.45H, tetrazole ring C—H).

From the data, the obtained liquid was identified as a mixture containing 1-[3-(trimethoxysilyl)propyl]-1H-tetrazole represented by the chemical formula (Ia-1) and 2-[3-(trimethoxysilyl)propyl]-2H-tetrazole represented by the chemical formula (Ib-1) in a ratio (mol %) of 55:45.

[Chem. 13]

(Ia-1)

(Ib-1)

Example 2

Synthesis of 5-methyl-1-[3-(trimethoxysilyl) propyl]-1H-tetrazole and 5-methyl-2-[3-(trimethoxysilyl)propyl]-2H-tetrazole>

To a solution consisting of 13.9 g (0.165 mol) of 5-methyl-1H-tetrazole and 85 mL of dehydrated N,N-dimethylformamide was added 9.4 g (0.174 mol) of sodium methoxide (powder) at room temperature, followed by stirring for 30 minutes.

Thereafter, thereto was added 32.9 g (0.166 mol) of 3-chloropropyltrimethoxysilane, followed by stirring at 89 to 92° C. for 4 hours.

The reaction mixture in the form of suspension was cooled to 3° C., and the insoluble matter was removed by filtration. Then, volatile contents (solvent, etc.) were distilled off under reduced pressure, to obtain a concentrate.

The concentrate was diluted (dispersed/dissolved) with 150 mL of isopropyl acetate and washed three times with 100 mL of saturated saline, and the organic layer was dried over magnesium sulfate. Then, volatile contents (solvent, etc.) were distilled off under reduced pressure, to obtain 35.9 g (0.146 mol, 88.5% yield) of a colorless liquid.

$^1$H NMR spectrum data of the obtained liquid were as follows.

$^1$H-NMR (DMSO-$d_6$) δ: 0.57 (m, 2H, —CH$_2$—Si), 1.86 (m, 0.7H, —CH$_2$CH$_2$—Si), 1.95 (m, 1.3H, —CH$_2$CH$_2$—Si), 2.45 (s, 1.9H, CH$_3$), 2.52 (s, 1.1H, CH$_3$), 3.48 (s, 9H, SiOCH$_3$), 4.29 (t, 1.3H, J=7.4 Hz, NCH$_2$—), 4.58 (t, 0.7H, J=7.4 Hz, NCH$_2$—).

From the data, the obtained liquid was identified as a mixture containing 5-methyl-1-[3-(trimethoxysilyl)propyl]-1H-tetrazole represented by the chemical formula (Ia-2) and 5-methyl-2-[3-(trimethoxysilyl)propyl]-2H-tetrazole represented by the chemical formula (Ib-2) in a ratio (mol %) of 35:65.

[Chem. 14]

(Ia-2)

(Ib-2)

Example 3

Synthesis of 5-phenyl-1-[3-(triethoxysilyl)propyl]-1H-tetrazole and 5-phenyl-2-[3-(triethoxysilyl)propyl]-2H-tetrazole To a solution consisting of 18.1 g (0.124 mol) of 5-phenyl-1H-tetrazole and 100 mL of dehydrated N,N-dimethylformamide was added 4.9 g (0.129 mol) of sodium hydride (oily, 63%) in three times at room temperature, followed by stirring for 30 minutes.

Thereafter, thereto was added 29.9 g (0.124 mol) of 3-chloropropyltriethoxysilane, followed by stirring at 88 to 90° C. for 4 hours.

The reaction mixture in the form of suspension was cooled to 3° C., and the insoluble matter was removed by filtration. Then, volatile contents (solvent, etc.) were distilled off under reduced pressure, to obtain a concentrate.

The concentrate was diluted (dispersed/dissolved) with 150 mL of isopropyl acetate and washed three times with 100 mL of saturated saline, and the organic layer was dried over magnesium sulfate. Then, volatile contents (solvent, etc.) were distilled off under reduced pressure, to obtain 38.9 g (0.111 mol, 89.7% yield) of a light yellow brown liquid.

$^1$H NMR spectrum data of the obtained liquid were as follows.

$^1$H-NMR (DMSO-$d_6$) δ: 0.59 (t, 2H, J=8 Hz, —CH$_2$—Si), 1.14 (t, 9H, J=7 Hz, CH$_3$), 2.05 (m, 2H, —CH$_2$CH$_2$—Si), 3.75 (q, 6H, J=7 Hz, Si—O—CH$_2$—), 4.52 (t, 0.2H, J=7 Hz, NCH$_2$—), 4.73 (t, 1.8H, J=7 Hz, NCH$_2$—), 7.56 (m, 3H, Ph), 8.08 (m, 2H, Ph).

From the data, the obtained liquid was identified as a mixture containing 5-phenyl-1-[3-(triethoxysilyl)propyl]-1H-tetrazole represented by the chemical formula (Ia-3) and 5-phenyl-2-[3-(triethoxysilyl)propyl]-2H-tetrazole represented by the chemical formula (Ib-3) in a ratio (mol %) of 10:90.

[Chem. 15]

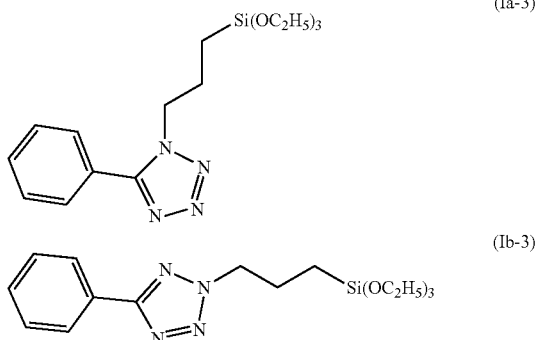

Example 4

Synthesis of 5-benzyl-1-[3-(triethoxysilyl)propyl]-1H-tetrazole and 5-benzyl-2-[3-(triethoxysilyl)propyl]-2H-tetrazole To a solution consisting of 17.3 g (0.108 mol) of 5-benzyl-1H-tetrazole and 100 mL of dehydrated N,N-dimethylformamide was added 4.2 g (0.111 mol) of sodium hydride (oily, 63%) in three times at room temperature, followed by stirring for 30 minutes.

Thereafter, thereto was added 26.0 g (0.108 mol) of 3-chloropropyltriethoxysilane, followed by stirring at 88 to 90° C. for 4 hours.

The reaction mixture in the form of suspension was cooled to room temperature, and the insoluble matter was removed by filtration. Then, volatile contents (solvent, etc.) were distilled off under reduced pressure, to obtain a concentrate.

The concentrate was diluted (dispersed/dissolved) with 150 mL of isopropyl acetate and washed three times with 100 mL of saturated saline, and the organic layer was dried over magnesium sulfate. Then, volatile contents (solvent, etc.) were distilled off under reduced pressure, to obtain 35.9 g (0.099 mol, 91.2% yield) of a light brown liquid.

$^1$H NMR spectrum data of the obtained liquid were as follows.

$^1$H-NMR (DMSO-$d_6$) δ: 0.50 (t, 2H, J=8 Hz, —CH$_2$—Si), 1.13 (t, 9H, J=7 Hz, CH$_3$), 1.71 (m, 0.5H, —CH$_2$CH$_2$—Si), 1.94 (m, 1.5H, —CH$_2$CH$_2$—Si), 3.72 (q, 6H, J=7 Hz, 4.23 (s, 1.5H, —CH$_2$Ph), 4.32 (t, 0.5H, J=6.8 Hz, NCH$_2$—), 4.36 (s, 0.5H, —CH$_2$Ph), 4.61 (t, 1.5H, J=6.8 Hz, NCH$_2$—), 7.28 (m, 5H, Ph).

From the data, the obtained liquid was identified as a mixture containing 5-benzyl-1-[3-(triethoxysilyl)propyl]-1H-tetrazole represented by the chemical formula (Ia-4) and 5-benzyl-2-[3-(triethoxysilyl)propyl]-2H-tetrazole represented by the chemical formula (Ib-4) in a ratio (mol %) of 25:75.

[Chem. 16]

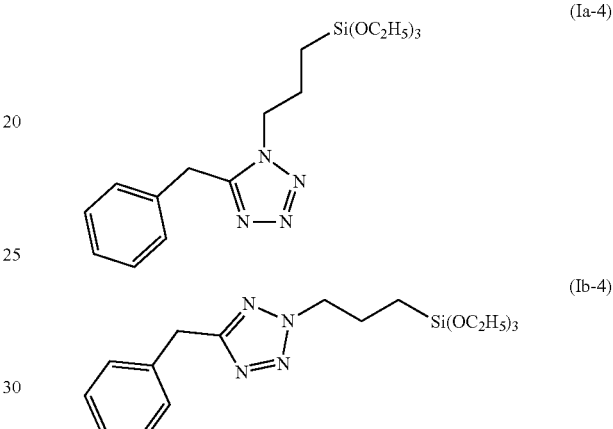

Example 5

Synthesis of 5-methylthio-1-[3-(triethoxysilyl)propyl]-1H-tetrazole and 5-methylthio-2-[3-(triethoxysilyl)propyl]-2H-tetrazole To a solution consisting of 15.0 g (0.129 mol) of 5-methylthio-1H-tetrazole and 100 mL of dehydrated N,N-dimethylformamide was added 5.0 g (0.131 mol) of sodium hydride (oily, 63%) in three times at room temperature, followed by stirring for 30 minutes.

Thereafter, thereto was added 31.1 g (0.129 mol) of 3-chloropropyltriethoxysilane, followed by stirring at 89 to 92° C. for 5 hours.

The reaction mixture in the form of suspension was cooled to room temperature, and the insoluble matter was removed by filtration. Then, volatile contents (solvent, etc.) were distilled off under reduced pressure, to obtain a concentrate.

The concentrate was diluted (dispersed/dissolved) with 150 mL of isopropyl acetate and washed three times with 100 mL of saturated saline, and the organic layer was dried over magnesium sulfate. Then, volatile contents (solvent, etc.) were distilled off under reduced pressure, to obtain 37.6 g (0.117 mol, 90.7% yield) of a light yellow liquid.

$^1$H NMR spectrum data of the obtained liquid were as follows.

$^1$H-NMR (DMSO-$d_6$) δ: 0.54 (t, 2H, J=8 Hz, —CH$_2$—Si), 1.14 (t, 9H, J=7 Hz, Si—O—CH$_2$CH$_3$), 1.86 (m, 0.5H, —CH$_2$CH$_2$—Si), 1.96 (m, 1.5H, —CH$_2$CH$_2$—Si), 2.65 (s, 2.2H, SCH$_3$), 2.76 (s, 0.8H, SCH$_3$), 3.74 (q, 6H, J=7 Hz, Si—O—CH$_2$), 4.26 (t, 0.5H, J=7 Hz, NCH$_2$—), 4.63 (s, 1.5H, J=7 Hz, NCH$_2$—).

From the data, the obtained liquid was identified as a mixture containing 5-methylthio-1-[3-(triethoxysilyl)propyl]-1H-tetrazole represented by the chemical formula (Ia-5) and 5-methylthio-2-[3-(triethoxysilyl)propyl]-2H-tetrazole represented by the chemical formula (Ib-5) in a ratio (mol %) of 25:75.

[Chem. 17]

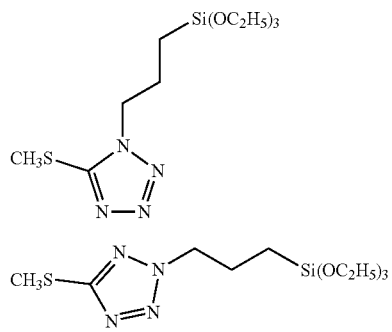

(Ia-5)

(Ib-5)

Example 6

Synthesis of 5-amino-1-[3-(trimethoxysilyl)propyl]-1H-tetrazole and 5-amino-2-[3-(trimethoxysilyl)propyl]-2H-tetrazole To a solution consisting of 23.0 g (0.270 mol) of 5-amino-1H-tetrazole and 200 mL of dehydrated N,N-dimethylformamide was added 51.9 g (0.270 mol) of a 28% sodium methoxide methanol solution at room temperature, followed by stirring for 30 minutes.

Thereafter, thereto was added 53.7 g (0.270 mol) of 3-chloropropyltrimethoxysilane, followed by stirring at 89 to 92° C. for 22 hours.

The reaction mixture in the form of suspension was cooled to 8° C., and the insoluble matter was removed by filtration. Then, volatile contents (solvent, etc.) were distilled off under reduced pressure, to obtain 100 g of a concentrate.

The concentrate was diluted (dispersed/dissolved) with 150 mL of isopropyl acetate and washed three times with 150 mL of saturated saline, and the organic layer was dried over magnesium sulfate. Then, volatile contents (solvent, etc.) were distilled off under reduced pressure, to obtain 58.3 g of a liquid concentrate.

The concentrate was washed twice with 100 mL of hexane, dried under reduced pressure, and allowed to cool to obtain 54.7 g (0.221 mol, 81.9% yield) of a white waxy solid.

$^1$H NMR spectrum data of the obtained solid were as follows.

$^1$H-NMR (DMSO-$d_6$) δ: 0.54 (t, 2H, J=8 Hz, —CH$_2$—Si), 1.75 (m, 0.8H, —CH$_2$CH$_2$—Si), 1.88 (m, 1.2H, —CH$_2$CH$_2$—Si), 3.47 (s, 9H, SiOCH$_3$), 4.05 (t, 0.8H, J=7 Hz, NCH$_2$—), 4.35 (t, 1.2H, J=7 Hz, NCH$_2$—), 5.98 (s, 1.2H, NH$_2$), 6.66 (s, 0.8H, NH$_2$).

From the data, the obtained solid was identified as a mixture containing 5-amino-1-[3-(trimethoxysilyl) propyl]-1H-tetrazole represented by the chemical formula (Ia-6) and 5-amino-2-[3-(trimethoxysilyl)propyl]-2H-tetrazole represented by the chemical formula (Ib-6) in a ratio (mol %) of 40:60.

[Chem. 18]

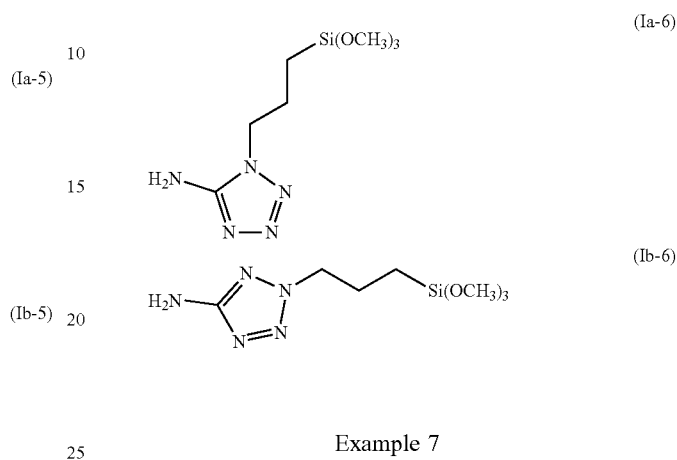

(Ia-6)

(Ib-6)

Example 7

Synthesis of 5-amino-1-[3-(triethoxysilyl)propyl]-1H-tetrazole and 5-amino-2-[3-(triethoxysilyl)propyl]-2H-tetrazole To a solution consisting of 23.4 g (0.275 mol) of 5-amino-1H-tetrazole and 220 mL of dehydrated N,N-dimethylformamide was added 93.6 g (0.275 mol) of a 20% sodium ethoxide ethanol solution at room temperature, followed by heating to 70° C. and stirring for 1 hour.

Thereafter, thereto was added dropwise 66.3 g (0.275 mol) of 3-chloropropyltriethoxysilane at 70° C. over 1 hour, followed by stirring at 98 to 100° C. for 20 hours.

The reaction mixture in the form of suspension was cooled to 7° C., and the insoluble matter was removed by filtration. Then, volatile contents (solvent, etc.) were distilled off under reduced pressure, to obtain 91 g of a concentrate.

The concentrate was diluted (dispersed/dissolved) with 220 mL of isopropyl acetate and washed three times with 220 mL of saturated saline, and the organic layer was dried over magnesium sulfate. Then, volatile contents (solvent, etc.) were distilled off under reduced pressure, to obtain 73.6 g of a liquid concentrate. The concentrate was washed twice with 220 mL of hexane, and volatile contents (solvent, etc.) were distilled off under reduced pressure, to obtain 65.8 g (0.227 mol, 82.7% yield) of a light brown liquid.

$^1$H NMR spectrum data of the obtained liquid were as follows.

$^1$H-NMR (DMSO-$d_6$) δ: 0.52 (t, 2H, J=8 Hz, —CH$_2$—Si), 1.14 (t, 9H, J=7 Hz, Si—O—CH$_2$CH$_3$), 1.75 (m, 0.8H, —CH$_2$CH$_2$—Si), 1.88 (m, 1.2H, —CH$_2$CH$_2$—Si), 3.74 (q, 6H, J=7 Hz, Si—O—CH$_2$), 4.06 (t, 0.8H, J=7 Hz, NCH$_2$—), 4.36 (t, 1.2H, J=7 Hz, NCH$_2$—), 5.97 (s, 1.2H, NH$_2$), 6.65 (s, 0.8H, NH$_2$). From the data, the obtained liquid was identified as a mixture containing 5-amino-1-[3-(triethoxysilyl)propyl]-1H-tetrazole represented by the chemical formula (Ia-7) and 5-amino-2-[3-(triethoxysilyl)propyl]-2H-tetrazole represented by the chemical formula (Ib-7) in a ratio (mol %) of 40:60.

[Chem. 19]

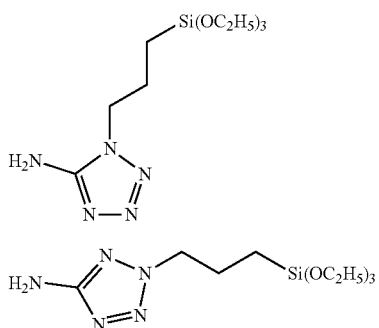

(Ia-7)

(Ib-7)

Example 8

Synthesis of 5-amino-1-[3-(triethoxysilyl)propyl]-1H-tetrazole and 5-amino-2-[3-(triethoxysilyl)propyl]-2H-tetrazole To 40 g of the mixture containing 5-amino-1-[3-(triethoxysilyl)propyl]-1H-tetrazole and 5-amino-2-[3-(triethoxysilyl)propyl]-2H-tetrazole obtained in Example 7 was added 300 mL of hexane, and the resulting mixture was heat to reflux for 10 minutes, returned to room temperature, and the supernatant hexane layer was fractionated by inclination. The remaining oily substance was similarly extracted three times with 300 mL of hexane. Volatile contents of the residue after hexane extraction were removed under reduced pressure to obtain 14.1 g of a colorless liquid.

$^1$H NMR spectrum data of the obtained liquid were as follows.

$^1$H-NMR (DMSO-$d_6$) δ: 0.52 (t, 2H, J=8 Hz, —CH$_2$—Si), 1.14 (t, 9H, J=7 Hz, Si—O—CH$_2$CH$_3$), 1.75 (m, 1.2H, —CH$_2$CH$_2$—Si), 1.88 (m, 0.8H, —CH$_2$CH$_2$—Si), 3.74 (q, 6H, J=7 Hz, Si—O—CH$_2$), 4.06 (t, 1.2H, J=7 Hz, NCH$_2$—), 4.36 (t, 0.8H, J=7 Hz, NCH$_2$—), 5.97 (s, 0.8H, NH$_2$), 6.65 (s, 1.2H, NH$_2$).

From the data, the obtained liquid was identified as a mixture containing 5-amino-1-[3-(triethoxysilyl)propyl]-1H-tetrazole represented by the chemical formula (Ia-8) and 5-amino-2-[3-(triethoxysilyl)propyl]-2H-tetrazole represented by the chemical formula (Ib-8) in a ratio (mol %) of 60:40.

[Chem. 20]

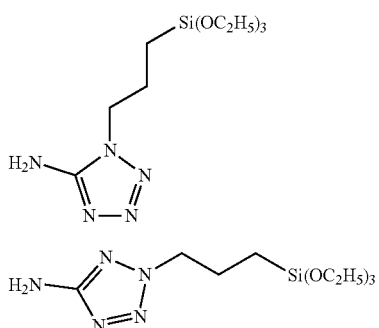

(Ia-8)

(Ib-8)

Example 9

Synthesis of 5-amino-1-[3-(triethoxysilyl)propyl]-1H-tetrazole and 5-amino-2-[3-(triethoxysilyl)propyl]-2H-tetrazole To 40 g of the mixture containing 5-amino-1-[3-(triethoxysilyl)propyl]-1H-tetrazole and 5-amino-2-[3-(triethoxysilyl)propyl]-2H-tetrazole obtained in Example 7 was added 300 mL of hexane, and the resulting mixture was heat to reflux for 10 minutes, returned to room temperature, and the supernatant hexane layer was fractionated by inclination. The remaining oily substance was similarly extracted three times with hexane. The hexane extracts were combined and concentrated under reduced pressure to about 300 mL, and the concentrated solution was allowed to stand for 1 hour with water cooling. The supernatant hexane layer was fractionated by inclination, and hexane was distilled off under reduced pressure to obtain 8.1 g of a colorless liquid.

$^1$H NMR spectrum data of the obtained liquid were as follows.

$^1$H-NMR (DMSO-$d_6$) δ: 0.52 (t, 2H, J=8 Hz, —CH$_2$—Si), 1.14 (t, 9H, J=7 Hz, Si—O—CH$_2$CH$_3$), 1.75 (m, 0.2H, —CH$_2$CH$_2$—Si), 1.88 (m, 1.8H, —CH$_2$CH$_2$—Si), 3.74 (q, 6H, J=7 Hz, Si—O—CH$_2$), 4.06 (t, 0.2H, J=7 Hz, NCH$_2$—), 4.36 (t, 1.8H, J=7 Hz, NCH$_2$—), 5.97 (s, 1.8H, NH$_2$), 6.65 (s, 0.2H, NH$_2$).

From the data, the obtained liquid was identified as a mixture containing 5-amino-1-[3-(triethoxysilyl)propyl]-1H-tetrazole represented by the chemical formula (Ia-9) and 5-amino-2-[3-(triethoxysilyl)propyl]-2H-tetrazole represented by the chemical formula (Ib-9) in a ratio (mol %) of 5:95.

[Chem. 21]

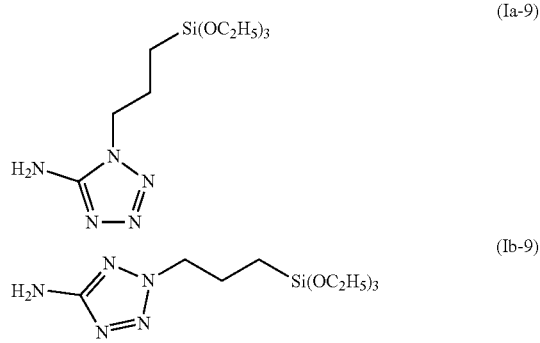

(Ia-9)

(Ib-9)

Example 10

Synthesis of 5-amino-1-[3-(triethoxysilyl)propyl]-1H-tetrazole and 5-amino-2-[3-(triethoxysilyl)propyl]-2H-tetrazole>

To 40 g of the mixture containing 5-amino-1-[3-(triethoxysilyl)propyl]-1H-tetrazole and 5-amino-2-[3-(triethoxysilyl)propyl]-2H-tetrazole obtained in Example 7 was added 500 mL of hexane, and the resulting mixture was heat to reflux for 10 minutes, returned to room temperature, and the supernatant hexane layer was fractionated by inclination. The remaining oily substance was similarly extracted five times with 500 mL of hexane. Volatile contents of the residue after hexane extraction were removed under reduced pressure to obtain 7.3 g of a white solid.

$^1$H NMR spectrum data of the obtained solid were as follows.

$^1$H-NMR (DMSO-$d_6$) δ: 0.52 (t, 2H, J=8 Hz, —CH$_2$—Si), 1.14 (t, 9H, J=7 Hz, Si—O—CH$_2$CH$_3$), 1.75 (m, 1.8H, —CH$_2$CH$_2$—Si), 1.88 (m, 0.2H, —CH$_2$CH$_2$—Si), 3.74 (q, 6H, J=7 Hz, Si—O—CH$_2$), 4.06 (t, 1.8H, J=7 Hz, NCH$_2$—), 4.36 (t, 0.2H, J=7 Hz, NCH$_2$—), 5.97 (s, 0.2H, NH$_2$), 6.65 (s, 1.8H, NH$_2$).

From the data, the obtained solid was identified as a mixture containing 5-amino-1-[3-(triethoxysilyl)propyl]-1H-tetrazole represented by the chemical formula (Ia-10) and 5-amino-2-[3-(triethoxysilyl)propyl]-2H-tetrazole represented by the chemical formula (Ib-10) in a ratio (mol %) of 95:5.

[Chem. 22]

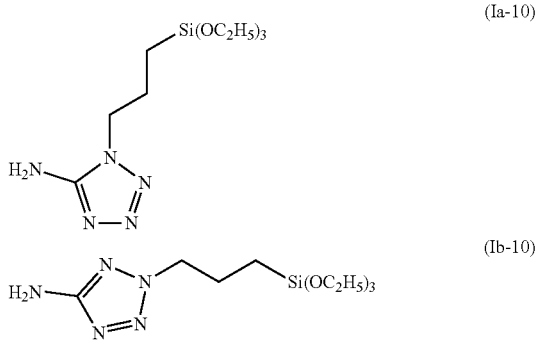

(Ia-10)

(Ib-10)

Example 11

Synthesis of 5-amino-2-[3-(triethoxysilyl)propyl]-2H-tetrazole

To 12 g of the mixture containing 5-amino-1-[3-(triethoxysilyl)propyl]-1H-tetrazole and 5-amino-2-[3-(triethoxysilyl)propyl]-2H-tetrazole obtained in Example 7 was added 200 mL of hexane, and the resulting mixture was heat to reflux for 10 minutes and returned to room temperature. The supernatant hexane layer was fractionated by inclination and left in a freezer at −20° C. overnight. The precipitated solid was collected by filtration with a glass filter and volatile contents were removed therefrom under reduced pressure, to obtain 1.5 g of a colorless liquid.

$^1$H NMR spectrum data of the obtained liquid were as follows.

$^1$H-NMR (DMSO-$d_6$) δ: 0.52 (t, 2.0H, J=8 Hz, —CH$_2$—Si), 1.14 (t, 9.0H, J=7 Hz, Si—O—CH$_2$CH$_3$), 1.88 (m, 2.0H, —CH$_2$CH$_2$—Si), 3.74 (q, 6.0H, J=7 Hz, Si—O—CH$_2$), 4.36 (t, 2.0H, J=7 Hz, NCH$_2$—), 5.97 (s, 2.0H, NH$_2$).

From the data, the obtained liquid was identified as 5-amino-2-[3-(triethoxysilyl)propyl]-2H-tetrazole represented by the chemical formula (Ib-11).

[Chem. 23]

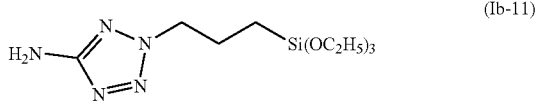

(Ib-11)

Example 12

Synthesis of 5-amino-1-[3-(triethoxysilyl)propyl]-1H-tetrazole

To 35 g of the mixture containing 5-amino-1-[3-(triethoxysilyl)propyl]-1H-tetrazole and 5-amino-2-[3-(triethoxysilyl)propyl]-2H-tetrazole obtained in Example 7 was added 400 mL of hexane, the resulting mixture was heat to reflux for 10 minutes and returned to room temperature, and the supernatant hexane layer was removed by inclination. When the oily substance of the extracted residue was left at room temperature for one day, a crystal precipitated. The crystal was collected by filtration through a glass filter, and the same operation was repeated once again by using 300 mL of hexane. The obtained crystal was dried under reduced pressure to obtain 3.6 g of a white crystal.

$^1$H NMR spectrum data of the obtained solid were as follows.

$^1$H-NMR (DMSO-$d_6$) δ: 0.52 (t, 2H, J=8 Hz, —CH$_2$—Si), 1.14 (t, 9H, J=7 Hz, Si—O—CH$_2$CH$_3$), 1.75 (m, 2H, —CH$_2$CH$_2$—Si), 3.74 (q, 6H, J=7 Hz, Si—O—CH$_2$), 4.06 (t, 2H, J=7 Hz, NCH$_2$—), 6.65 (s, 2.0H, NH$_2$).

From the data, the obtained solid was identified as 5-amino-1-[3-(triethoxysilyl)propyl]-1H-tetrazole represented by the chemical formula (Ia-12).

[Chem. 24]

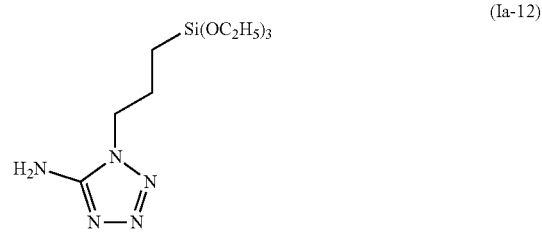

(Ia-12)

Preparation of Surface Treatment Solution for Copper and Evaluation on Bonding Property

Example 13

A surface treatment solution for copper was prepared by using the tetrazole silane compound (mixture) synthesized in Example 1 as a silane coupling agent component.

That is, to 10 g of the tetrazole silane compound of the mixture was added 200 g of ethylene glycol monobutyl ether and then, thereto was further added 790 g of water, followed by stirring at room temperature for 2 hours, to thereby prepare a surface treatment solution for copper (hereinafter, referred to as treatment solution A).

For this treatment solution A, it was confirmed that the trimethoxysilyl group of the tetrazole silane compound was hydrolyzed to a trihydroxysilyl group, and the following bonding property evaluation tests (a) to (c) and haloing evaluation tests (d) and (e) were performed.

The test results obtained were as shown in Table 2.

Examples 14 to 24

In the same manner as in Example 13, surface treatment solutions for copper (hereinafter, referred to as treatment solutions B, C, D, E, F, G, H, I, J, K, and L, respectively)

were prepared except for using the tetrazole silane compounds (mixtures) synthesized in Examples 2 to 12, instead of the tetrazole silane compound (mixture) synthesized in Example 1.

For these treatment solutions, it was confirmed that the trimethoxysilyl group or triethoxysilyl group of the tetrazole silane compound was hydrolyzed to a trihydroxysilyl group, and the following bonding property evaluation tests (a) to (c) and haloing evaluation tests (d) and (e) were performed.

The test results obtained were as shown in Table 2.

Comparative Example 1

In the same manner as in Example 13, a surface treatment solution for copper (hereinafter, referred to as treatment solution M) was prepared except for using 1-[3-(trimethoxysilyl) propyl]-1,2,4-triazole, instead of the tetrazole silane compound (mixture) synthesized in Example 1.

For this treatment solution M, it was confirmed that the trimethoxysilyl group of the triazole silane compound was hydrolyzed to a trihydroxysilyl group, and the following bonding property evaluation tests (a) to (c) and haloing evaluation tests (d) and (e) were performed.

The test results obtained were as shown in Table 2.

Comparative Example 2

A surface treatment solution for copper (hereinafter, referred to as treatment solution N) having the same composition as the treatment solution A except that no silane coupling agent component was used was prepared, and the following bonding property evaluation tests (a) to (c) and haloing evaluation tests (d) and (e) were performed.

The test results obtained were as shown in Table 2.

Bonding Property Evaluation Tests

Bonding Property Evaluation Test (a)

(1) Test Piece
An electrolytic copper foil (thickness: 18 μm) was used as a test piece.
(2) Treatment on Test Piece
The test piece was treated according to the following steps i to ii.
i. Acid cleansing/1 minute (room temperature), washing with water, drying/1 minute (100° C.)
ii. Immersion in surface treatment solution/1 minute (room temperature), washing with water, drying/1 minute (100° C.)
(3) Bonding Between Test Piece and Resin
A prepreg (FR-4 grade) impregnated with a glass cloth epoxy resin was laminated and pressed on the S surface (glossy surface) of the treated test piece to bond the test piece and the resin, to thereby prepare a printed wiring board.
(4) Evaluation on Bonding Property
A test piece having a width of 10 mm was prepared from the printed wiring board in accordance with "JIS C6481 (1996)", subjected to a pressure cooker treatment (121° C./100% humidity/100 hours), and then the peel strength (kN/m) of the copper foil was measured.

Bonding Property Evaluation Test (b)

The bonding property between copper and the resin was evaluated in the same procedures as in the bonding property evaluation test (a) except for "laminating a resin for build-up wiring board (product name "GX-T31", manufactured by Ajinomoto Fine-Techno Co., Inc.)" instead of "laminating and pressing the prepreg (FR-4 grade) impregnated with a glass cloth epoxy resin" on the S surface (glossy surface) of the test piece.

Bonding Property Evaluation Test (c)

(1) Test Piece
A double-sided copper-clad laminate (base material: FR4, plate thickness: 1.0 mm, copper foil thickness: 18 μm, length 120 mm×width 110 mm) subjected to electrolytic copper plating (plating thickness: 20 μm) was used as a test piece of the printed wiring board.
(2) Treatment on Test Piece
The test piece was treated according to the following steps i to ii.
i. Acid cleansing/1 minute (room temperature), washing with water, drying/1 minute (100° C.)
ii. Immersion in surface treatment solution/1 minute (room temperature), washing with water, drying/1 minute (100° C.)
(3) Formation of Insulating Resin Layer on Test Piece
The treated test piece was coated with a solder resist (trade name "PSR-4000AUS308", manufactured by TAIYO INK MFG. CO., LTD.), and then dried (80° C./30 minutes) and post-cured (150° C./60 minutes), to thereby form a 13 μm thick insulating resin layer (coating film).
(4) Evaluation on Bonding Property
In accordance with "JIS K5400-8.5 (1990)", the coating film formed on the test piece was cross-cut (100 squares) to 1 mm×1 mm grids, and subjected to a pressure cooker treatment (121° C./100% humidity/100 hours). Thereafter, a tape peel test was performed, and the number of squares where the coating film did not peel was counted. Furthermore, the degree of damage of the coating film was visually observed.

The criteria for determining the bonding property are as shown in Table 1.

TABLE 1

| Degree of damage of coating film | Determination |
| --- | --- |
| Each cut line is thin and smooth on both sides, and does not peel offat every intersection of the cut lines and the square. | A |
| There is slight peeling at the intersection of the cut lines, and thereis no peeling at the square, and the area of the defect is within 5% of the total square area. | B |
| There is peeling on both sides of the cut line and the intersection, and the area of the defect is 5 to 15% of the total square area. | C |
| The width of peeling due to the cut line is large, and the area of the defect is 15 to 35% of the total square area. | D |
| The width of peeling due to the cut line is wider than in the case of D determination, and the area of the defect is 35 to 65% of the total square area. | E |
| The peeling area is 65% or more of the total square area. | F |

Haloing Evaluation Test (d)

(1) Test Piece
A copper-clad laminate (copper thickness 35 plate thickness 1.0 mm) was used as a test piece.

(2) Treatment on Test Piece

The test piece was treated according to the following steps i to ii.

i. Acid washing/1 minute (room temperature), washing with water ii. Immersion in surface treatment solution/1 minute (30° C.), washing with water, drying/1 minute (100° C.)

(3) Preparation of Printed Wiring Board

A solder resist (trade name "PSR-4000AUS308", manufactured by TAIYO INK MFG. CO., LTD.) was coated to the copper surface of the test piece, and then the following steps iii to iv were performed, to thereby prepare a printed wiring board in which a cured product of the solder resist having a copper opening (opening diameter: 150 μm, 5 holes) and the test piece (copper-clad laminate) were bonded to each other.

iii. Exposure step (420 mJ/cm$^2$, using HMW-680, manufactured by ORC MANUFACTURING CO., LTD.), development step (1% by mass of sodium carbonate aqueous solution/90 seconds (30° C.))

iv. Drying (80° C./30 minutes), post curing (150° C./60 minutes)

(4) Plating Treatment

For the copper opening of the printed wiring board, the following step v was performed by using a palladium catalyst (product name "ICP Nicolon Axela", manufactured by OKUNO CHEMICAL INDUSTRIES CO., LTD.), nickel plating (product name "ICP Nicolon GM", manufactured by OKUNO CHEMICAL INDUSTRIES CO., LTD.) and gold plating (product name "OL II", manufactured by KOJIMA CHEMICALS CO., LTD.) as a plating solution, to thereby perform a gold plating treatment.

v. Soft etching/1 minute (30° C.), washing with water, palladium catalyst/2 minutes (room temperature), nickel plating/35 minutes (75° C.), gold plating/5 minutes (80° C.)

(2) Treatment on Test Piece

The test piece was treated according to the following steps i to ii.

i. Acid washing/1 minute (room temperature), washing with water ii. Immersion in surface treatment solution/1 minute (30° C.), washing with water, drying/1 minute (100° C.)

(3) Preparation of Printed Wiring Board

A resin for build-up wiring board (product name "GX-T31", manufactured by Ajinomoto Fine-Techno Co., Inc.) was laminated on the copper surface of the test piece and then thermally cured, to thereby prepare a printed wiring board in which a cured product with a build-up resin and the test piece (copper-clad laminate) were bonded to each other. Then, copper openings (opening diameter 50 μm, 100 holes) were formed by laser processing.

(4) Plating Treatment

A chemical copper plating treatment was performed on the copper openings of the printed wiring board by using an OPC copper system manufactured by OKUNO CHEMICAL INDUSTRIES CO., LTD., and a via copper plating was further performed on the openings by using a Top Lucina system manufactured by OKUNO CHEMICAL INDUSTRIES CO., LTD.

(5) Evaluation on Haloing Ability

For the copper-plated copper opening (opening diameter 50 μm) of the obtained printed wiring board, the width (unit: μm) of haloing (peeling of the build-up resin) due to the penetration of the chemical solution was measured with an FIB cross section processing machine JIB4000 (manufactured by JEOL Ltd.) and an electron microscope JSM7610F (manufactured by JEOL Ltd.). The measurement was performed for 5 holes, and the average value thereof was calculated.

TABLE 2

| | | | | (a) peel strength (kN/m) | (b) peel strength (kN/m) | (c) damage of coating film | (d) haloing width (μm) | (e) haloing width (μm) |
|---|---|---|---|---|---|---|---|---|
| | | | Example No. of compound | | | | | |
| Example | 13 | Treatment solution A | 1 | 0.88 | 0.77 | B | 44 | 31 |
| | 14 | Treatment solution B | 2 | 0.65 | 0.61 | B | 33 | 40 |
| | 15 | Treatment solution C | 3 | 0.40 | 0.45 | A | 30 | 52 |
| | 16 | Treatment solution D | 4 | 0.41 | 0.41 | A | 35 | 61 |
| | 17 | Treatment solution E | 5 | 0.59 | 0.49 | B | 24 | 43 |
| | 18 | Treatment solution F | 6 | 0.91 | 0.74 | A | 18 | 0 |
| | 19 | Treatment solution G | 7 | 0.90 | 0.78 | A | 18 | 0 |
| | 20 | Treatment solution H | 8 | 0.90 | 0.78 | A | 17 | 0 |
| | 21 | Treatment solution I | 9 | 0.91 | 0.76 | A | 14 | 0 |
| | 22 | Treatment solution J | 10 | 0.88 | 0.77 | A | 16 | 0 |
| | 23 | Treatment solution K | 11 | 0.92 | 0.78 | A | 16 | 0 |
| | 24 | Treatment solution L | 12 | 0.87 | 0.75 | A | 15 | 0 |
| Comparative Example | 1 | Treatment solution M | | 0.21 | 0.11 | F | 96 | 77 |
| | 2 | Treatment solution N | | 0.17 | 0.12 | F | 108 | 105 |

(5) Evaluation on Haloing Ability

For the gold-plated copper opening (opening diameter 150 μm) of the obtained printed wiring board, the width (unit: μm) of haloing (peeling of the solder resist) due to the penetration of the chemical solution was measured with an optical microscope SZ-61 (manufactured by OLYMPUS). The measurement was performed for 5 holes, and the average value thereof was calculated.

Haloing Evaluation Test (e)

(1) Test Piece

A copper-clad laminate (copper thickness 35 μm, plate thickness 1.0 mm) was used as a test piece.

According to the test results shown in Table 2, it is recognized that the surface treatment solution for copper, using the tetrazole silane compound of the present invention as a silane coupling agent component, has an excellent effect of improving the bonding force between copper and resin and the haloing resistance.

Particularly in the case of a tetrazole silane compound having an amino group or a methyl group and an unsubstituted tetrazole silane compound, the effect of improving the bonding force between copper and resin and the haloing resistance is remarkable. Among these, in the case of a tetrazole silane compound having an amino group, the above-described bonding force and haloing resistance are dramatically improved.

Although the present invention has been described in detail and by reference to specific embodiments, it is apparent to those skilled in the art that it is possible to add various alterations and modifications without departing from the spirit and the scope of the present invention. The present application is based on Japanese Patent Application (No. 2017-182673) filed on Sep. 22, 2017, and the whole contents thereof are incorporated herein by reference. In addition, all references referred herein are entirely incorporated.

INDUSTRIAL APPLICABILITY

Since the tetrazole silane compound according to the present invention can provide a silane coupling agent having both functions of preventing a metal from rust, which is a feature of an azole compound, and curing an epoxy resin or a urethane resin, it is expected to be utilized in a composite material such as a printed wiring board produced by combining different kinds of materials.

According to the present invention, since the bonding property (adhesion property) of a metal, an inorganic material and a resin material can be sufficiently ensured, the surface of a base material can be maintained in a smooth state without being roughened. Therefore, the present invention is able to largely contribute to realization of miniaturization, thickness reduction, higher frequency, higher density, or the like in a multilayer printed wiring board, so that the industrial applicability is great.

The invention claimed is:

1. A silane coupling agent comprising a tetrazole silane compound represented by the following chemical formula (IV) as a component:

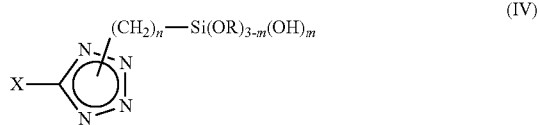

(IV)

wherein in formula (IV), X represents a hydrogen atom, a linear or branched alkyl group having a carbon number of 1 to 12, an aryl group, an aralkyl group, an alkylthio group having a carbon number of 1 to 6, or an amino group which may have a substituent; n represents an integer of 1 to 12; R represents a methyl group or an ethyl group; and m represents an integer of 1 to 3.

2. A surface treatment solution comprising a tetrazole silane compound represented by the following chemical formula (IV):

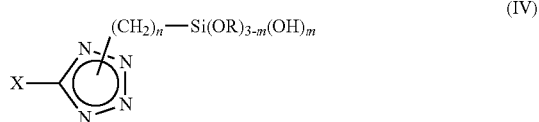

(IV)

wherein in formula (IV), X represents a hydrogen atom, a linear or branched alkyl group having a carbon number of 1 to 12, an aryl group, an aralkyl group, an alkylthio group having a carbon number of 1 to 6, or an amino group which may have a substituent; n represents an integer of 1 to 12; R represents a methyl group or an ethyl group; and m represents 0 or an integer of 1 to 3.

3. The surface treatment solution according to claim 2, which is used for treating a surface of at least one material selected from the group consisting of a metal, an inorganic material and a resin material.

4. The surface treatment solution according to claim 2, which is used for bonding two materials selected from the group consisting of a metal, an inorganic material and a resin material.

5. The surface treatment solution according to claim 3, wherein the metal is at least one selected from the group consisting of copper, aluminum, titanium, nickel, tin, iron, silver, gold, and alloys thereof.

6. The surface treatment solution according to claim 3, wherein the metal is copper or a copper alloy.

7. The surface treatment solution according to claim 3, wherein the inorganic material is at least one selected from the group consisting of silicon, a ceramic, a glass and an inorganic salt.

8. The surface treatment solution according to claim 7, wherein the ceramic is at least one selected from the group consisting of alumina, silicon carbide, aluminum nitride, silicon nitride, and barium titanate.

9. The surface treatment solution according to claim 3, wherein the resin material is at least one selected from the group consisting of an acrylate resin, an epoxy resin, an olefin resin, a polybenzoxazole resin, a silicone resin, and a polyimide resin.

10. A surface treatment method of metal, comprising bringing the surface treatment solution described in claim 2 into contact with a surface of a metal.

11. The surface treatment method of metal according to claim 10, wherein the metal is at least one selected from the group consisting of copper, aluminum, titanium, nickel, tin, iron, silver, gold, and alloys thereof.

12. The surface treatment method of metal according to claim 10, wherein the metal is copper or a copper alloy.

13. The surface treatment method of metal according to claim 12, comprising, before bringing the surface treatment solution into contact with a surface of copper or a copper alloy, bringing an aqueous solution containing a copper ion into contact with the surface of the copper or the copper alloy.

14. The surface treatment method of metal according to claim 12, comprising, after bringing the surface treatment solution into contact with a surface of copper or a copper alloy, bringing an aqueous acidic solution or an aqueous alkaline solution into contact with the surface of the copper or the copper alloy.

15. A surface treatment method of an inorganic material, comprising bringing the surface treatment solution described in claim 2 into contact with a surface of an inorganic material.

16. The surface treatment method of an inorganic material according to claim 15, wherein the inorganic material is at least one selected from the group consisting of silicon, a ceramic, a glass and an inorganic salt.

17. The surface treatment method of an inorganic material according to claim 16, wherein the ceramic is at least one selected from the group consisting of alumina, silicon carbide, aluminum nitride, silicon nitride, and barium titanate.

18. A surface treatment method of a resin material, comprising bringing the surface treatment solution described in claim 2 into contact with a surface of a resin material.

19. The surface treatment method of a resin material according to claim 18, wherein the resin material is at least one selected from the group consisting of an acrylate resin, an epoxy resin, an olefin resin, a polybenzoxazole resin, a silicone resin, and a polyimide resin.

20. A bonding method between a metal and a resin material, comprising bringing the surface treatment solution described in claim 2 into contact with at least one of a metal and a resin material to form a chemical film, and bonding the metal and the resin material to each other through the chemical film.

21. A bonding method between an inorganic material and a resin material, comprising bringing the surface treatment solution described in claim 2 into contact with at least one of an inorganic material and a resin material to form a chemical film, and bonding the inorganic material and the resin material to each other through the chemical film.

22. A bonding method between a metal and an inorganic material, comprising bringing the surface treatment solution described in claim 2 into contact with at least one of a metal and an inorganic material to form a chemical film, and bonding the metal and the inorganic material to each other through the chemical film.

23. A printed wiring board comprising two materials selected from the group consisting of a metal, an inorganic material and a resin material, bonded through a chemical film formed from the surface treatment solution described in claim 2.

24. A semiconductor wafer comprising two materials selected from the group consisting of a metal, an inorganic material and a resin material, bonded through a chemical film formed from the surface treatment solution described in claim 2.

25. An electronic device comprising two materials selected from the group consisting of a metal, an inorganic material and a resin material, bonded through a chemical film formed from the surface treatment solution described in claim 2.

26. An insulating composition comprising the silane coupling agent described in claim 1 and a resin material or an inorganic material.

27. The insulating composition according to claim 26, wherein the resin material is at least one selected from the group consisting of an acrylate resin, an epoxy resin, an olefin resin, a polybenzoxazole resin, a silicone resin, and a polyimide resin.

28. The insulating composition according to claim 26, wherein the inorganic material is at least one selected from the group consisting of silicon, a ceramic, a glass and an inorganic salt.

29. An insulating material comprising the insulating composition described in claim 26.

30. A printed wiring board comprising an insulating layer obtained from the insulating composition described in claim 26.

31. A semiconductor wafer comprising an insulating layer obtained from the insulating composition described in claim 26.

32. An electronic device comprising an insulating layer obtained from the insulating composition described in claim 26.

* * * * *